United States Patent
Nakajima et al.

(10) Patent No.: US 12,388,484 B2
(45) Date of Patent: Aug. 12, 2025

(54) RADIO FREQUENCY MODULE AND COMMUNICATION DEVICE

(71) Applicant: Murata Manufacturing Co., Ltd., Kyoto (JP)

(72) Inventors: Reiji Nakajima, Kyoto (JP); Kazuhiro Ikarashi, Kyoto (JP); Shunji Yoshimi, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 418 days.

(21) Appl. No.: 18/176,602

(22) Filed: Mar. 1, 2023

(65) Prior Publication Data

US 2023/0208468 A1    Jun. 29, 2023

Related U.S. Application Data

(63) Continuation of application No. PCT/JP2021/033403, filed on Sep. 10, 2021.

(30) Foreign Application Priority Data

Nov. 4, 2020 (JP) ................................. 2020-184587

(51) Int. Cl.
  *H04B 1/401* (2015.01)
(52) U.S. Cl.
  CPC .................... *H04B 1/401* (2013.01)
(58) Field of Classification Search
  CPC .................................................... H04B 1/401
  See application file for complete search history.

(56) References Cited

U.S. PATENT DOCUMENTS

| | | | |
|---|---|---|---|
| 6,999,716 B1 * | 2/2006 | Andre | G01S 19/36 455/150.1 |
| 10,972,091 B1 * | 4/2021 | Malladi | H03K 17/693 |
| 2009/0303126 A1 * | 12/2009 | Jain | G01S 13/003 342/368 |

(Continued)

FOREIGN PATENT DOCUMENTS

| | | |
|---|---|---|
| WO | 2019/187744 A1 | 10/2019 |
| WO | 2019/188290 A1 | 10/2019 |

OTHER PUBLICATIONS

International Search Report for PCT/JP2021/033403 dated Dec. 7, 2021.

*Primary Examiner* — Hsinchun Liao
(74) *Attorney, Agent, or Firm* — McDonald Hopkins LLC

(57) ABSTRACT

Isolation between a first path and a second path is improved. A radio frequency module is capable of operating in a first mode in which simultaneous transmission, simultaneous reception, or simultaneous transmission and reception using both a first filter and a second filter is possible, and in a second mode in which transmission or reception using only the first filter is possible. A first switching element is provided in a first path that is usable between an antenna terminal and the first filter in the first mode, and a second switching element is provided between the first path and a ground. A third switching element is provided in a second path that is usable between the antenna terminal and the first filter in the second mode, and a fourth switching element is provided between the second path and the ground. The radio frequency module further includes a phase shifter.

20 Claims, 12 Drawing Sheets

(56) References Cited

U.S. PATENT DOCUMENTS

| | | |
|---|---|---|
| 2014/0073268 A1 | 3/2014 | Taniuchi et al. |
| 2017/0041038 A1* | 2/2017 | Kirkpatrick .............. H04B 1/48 |
| 2017/0244432 A1 | 8/2017 | Ranta et al. |
| 2021/0006272 A1 | 1/2021 | Takeuchi |
| 2021/0006273 A1 | 1/2021 | Tahara et al. |

* cited by examiner

RADIO FREQUENCY MODULE AND COMMUNICATION DEVICE

CROSS REFERENCE TO RELATED APPLICATION

This is a continuation of International Application No. PCT/JP2021/033403 filed on Sep. 10, 2021 which claims priority from Japanese Patent Application No. 2020-184587 filed on Nov. 4, 2020. The contents of these applications are incorporated herein by reference in their entireties.

BACKGROUND ART

Technical Field

The present disclosure generally relates to a radio frequency module and a communication device, and more particularly, to a radio frequency module including multiple filters and a communication device including the radio frequency module.

Patent Document 1 discloses a radio frequency module including multiple filters, a switch, and a variable phase shifter.

The multiple filters include a first filter and a second filter. The first filter arrows a signal in a first frequency band to pass through. The second filter arrows a signal in a second frequency band to pass through. The switch electrically connects only the first filter to an antenna in a single mode in which only a signal in the first frequency band is communicated. The switch electrically connects the first filter, the second filter, and the variable phase shifter to the antenna in a carrier aggregation mode in which a signal in the first frequency band and a signal in the second frequency band are simultaneously communicated.

Patent Document 1: International Publication No. 2019/187744

BRIEF SUMMARY

In a radio frequency module, in a case that a switch separates a first path through which a signal of a first frequency band passes in a first mode such as a single mode, and a second path through which a signal of the first frequency band passes in a second mode such as a carrier aggregation mode, for example, it is desirable to improve isolation between the first path and the second path.

The present disclosure provides a radio frequency module and a communication device capable of improving the isolation between a first path and a second path.

A radio frequency module according to an aspect of the present disclosure includes an antenna terminal, a first filter, a second filter, and a switch circuit. The first filter is a filter having a pass band of a first frequency band. The second filter is a filter having a pass band of a second frequency band different from the first frequency band. The switch circuit is connected between the antenna terminal and the first filter. The radio frequency module is capable of operating in a first mode in which simultaneous transmission, simultaneous reception, or simultaneous transmission and reception using both the first filter and the second filter is possible, and in a second mode in which transmission or reception using only the first filter out of the first filter and the second filter is possible. The switch circuit includes a first switching element, a second switching element, a third switching element, and fourth switching element. The first switching element is provided in a first path that is usable between the antenna terminal and the first filter in the first mode. The second switching element is provided between the first path and a ground. The third switching element is provided in a second path that is usable between the antenna terminal and the first filter in the second mode. The fourth switching element is provided between the second path and the ground. The radio frequency module further includes a phase shifter. The phase shifter is provided in at least one of the first path and the second path, and changes a phase of a radio frequency signal.

A radio frequency module according to an aspect of the present disclosure includes an antenna terminal, a first filter, a second filter, and a switch circuit. The first filter is a filter having a pass band of a first frequency band. The second filter is a filter having a pass band of a second frequency band different from the first frequency band. The switch circuit is connected between the antenna terminal and the first filter. The radio frequency module is capable of operating in a first mode in which simultaneous transmission, simultaneous reception, or simultaneous transmission and reception using both the first filter and the second filter is possible, and in a second mode in which transmission or reception using only the first filter out of the first filter and the second filter is possible. The radio frequency module includes a first switching element, a second switching element, and a third switching element. The first switching element is provided in a first path that is usable between the antenna terminal and the first filter in the first mode. The second switching element is provided in a second path that is usable between the antenna terminal and the first filter in the second mode. The third switching element is provided between a ground and a common path of the first path and the second path. The radio frequency module further includes a phase shifter. The phase shifter is provided in at least one of the first path and the second path, and changes the phase of a radio frequency signal.

A communication device according to an aspect of the present disclosure includes the radio frequency module according to the aspect described above and a signal processing circuit. The signal processing circuit is connected to the radio frequency module.

In the radio frequency module according to the aspects described above and the communication device according to the aspect described above of the present disclosure, it is possible to improve the isolation between a first path and a second path.

DESCRIPTION OF EMBODIMENTS

Figure 5:
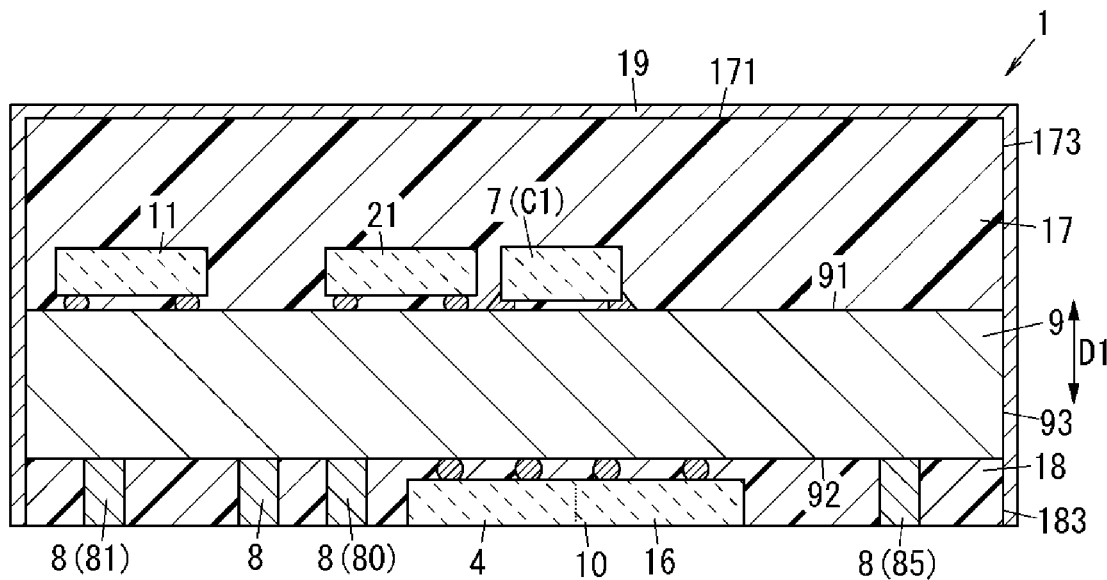
FIG. 5 is a sectional view of the radio frequency module according to Embodiment 1.
Figure 12:
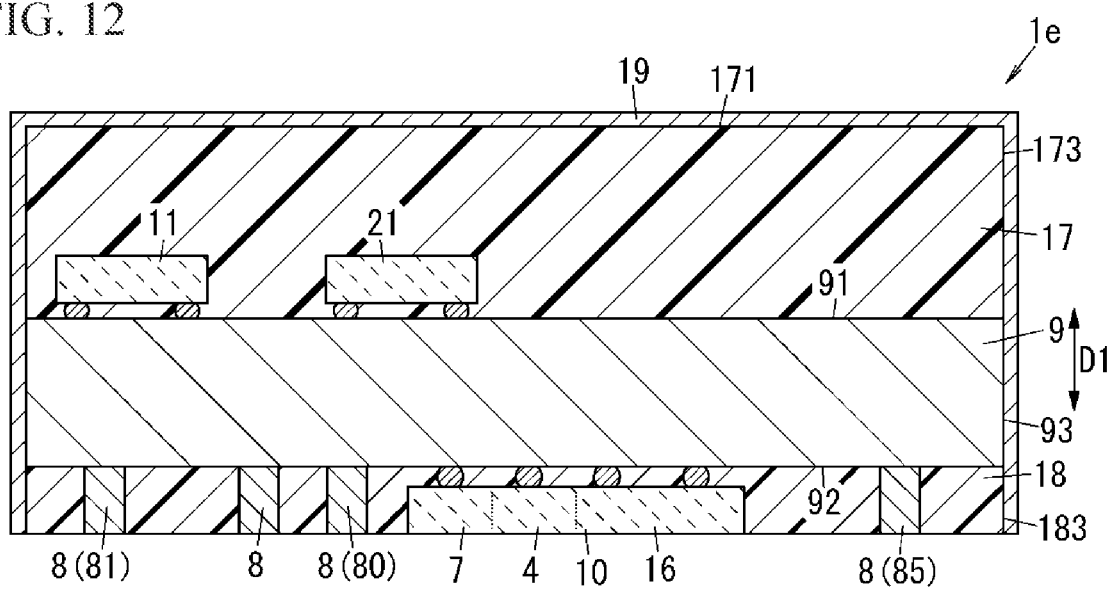
FIG. 12 is a sectional view of the radio frequency module according to Embodiment 5.
Figure 13:
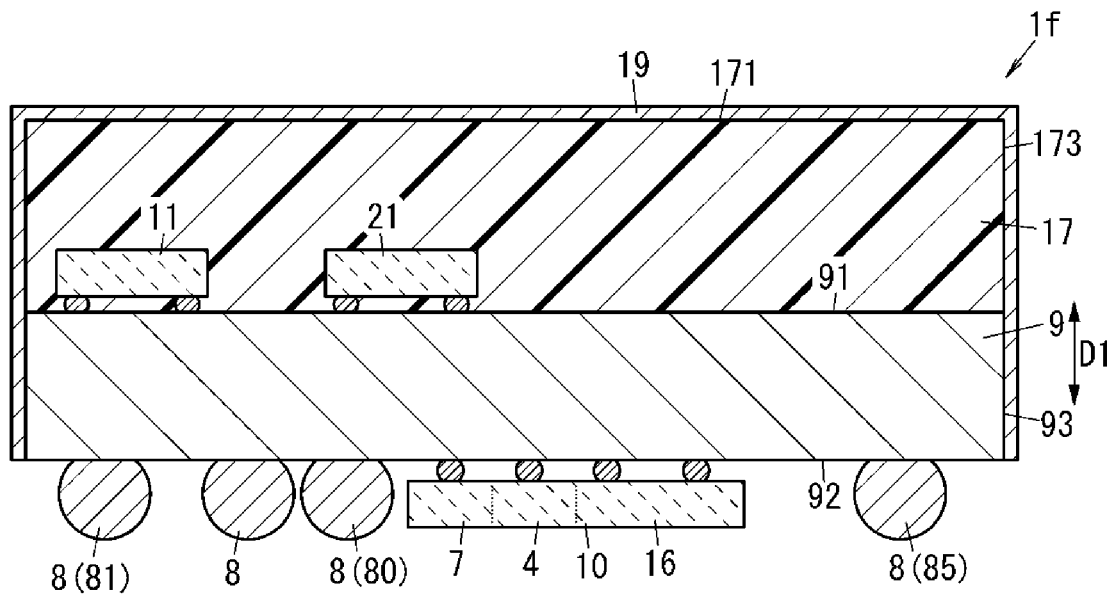
FIG. 13 is a sectional view of a radio frequency module according to a modification of Embodiment 5.
Figure 14:
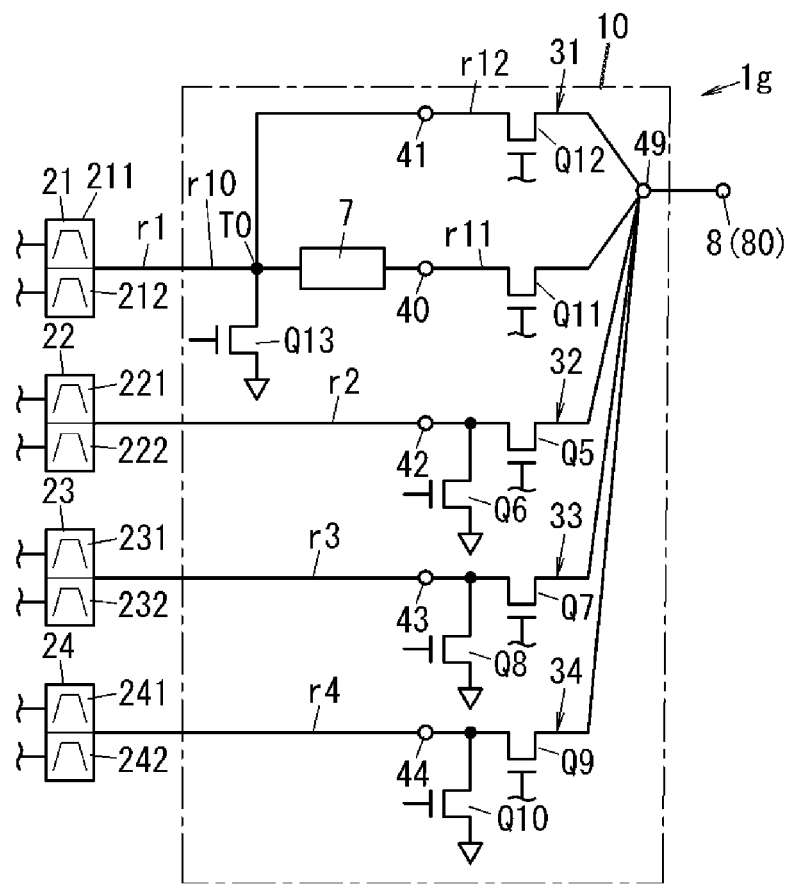
FIG. 14 is a circuit diagram of a radio frequency module according to Embodiment 6.

FIG. 5, FIG. 12, and FIG. 13 referred to in the following embodiments and the like are all schematic views, and a ratio of each of sizes and thicknesses of constituents in the drawings does not necessarily reflect an actual dimensional ratio.

Embodiment 1

Hereinafter, a radio frequency module 1 and a communication device 300 according to Embodiment 1 will be described with reference to FIG. 1 to FIG. 5.

(1) Radio Frequency Module and Communication Device (1.1) Circuit Configuration of Radio Frequency Module and Communication Device A circuit configuration of the radio frequency module 1 and the communication device 300 according to Embodiment 1 will be described with reference to FIG. 1 to FIG. 3.

The radio frequency module 1 according to Embodiment 1 is used in the communication device 300, for example. The communication device 300 is a mobile phone (smartphone, for example), for example, but is not limited thereto, and may be a wearable terminal (smart watch, for example) or the like, for example. The radio frequency module 1 is a module capable of dealing with the 4th Generation Mobile Communication (4G) standard and the 5th Generation Mobile Communication (5G) standard, for example. The 4G standard is the Third Generation Partnership Project (3GPP) Long Term Evolution (LTE) standard, for example. The 5G standard is 5G New Radio (NR), for example. The radio frequency module 1 is a module capable of dealing with carrier aggregation and dual connectivity.

The radio frequency module 1 is configured to be able to amplify a transmission signal inputted from a signal processing circuit 301 and to output the amplified transmission signal to an antenna 310, for example. Further, the radio frequency module 1 is configured to be able to amplify a reception signal inputted from the antenna 310 and to output the amplified reception signal to the signal processing circuit 301. The signal processing circuit 301 is not a constituent of the radio frequency module 1, but a constituent of the communication device 300 including the radio frequency module 1. The radio frequency module 1 according to Embodiment 1 is controlled by the signal processing circuit 301 included in the communication device 300, for example. The communication device 300 includes the radio frequency module 1 and the signal processing circuit 301. The communication device 300 further includes the antenna 310.

The signal processing circuit 301 includes an RF signal processing circuit 302 and a baseband signal processing circuit 303, for example. The RF signal processing circuit 302 is a Radio Frequency Integrated Circuit (RFIC), for example, and performs signal processing on a radio frequency signal. The RF signal processing circuit 302 performs signal processing such as up-conversion on a radio frequency signal (transmission signal) outputted from the baseband signal processing circuit 303, and outputs the radio frequency signal subjected to the signal processing, for example. Further, the RF signal processing circuit 302 performs signal processing such as down-conversion on a radio frequency signal (reception signal) outputted from the radio frequency module 1, and outputs the radio frequency signal subjected to the signal processing to the baseband signal processing circuit 303, for example. The baseband signal processing circuit 303 is a Baseband Integrated Circuit (BBIC), for example. The baseband signal processing circuit 303 generates an I-phase signal and a Q-phase signal from a baseband signal. The baseband signal is an audio signal, an image signal, or the like inputted from the outside, for example. The baseband signal processing circuit 303 performs IQ modulation processing by combining the I-phase signal and the Q-phase signal, and outputs a transmission signal. At this time, the transmission signal is generated as a modulated signal (IQ signal) subjected to amplitude modulation of a carrier signal of a predetermined frequency with a period longer than the period of the carrier signal. The reception signal processed by the baseband signal processing circuit 303 is used as an image signal for image display, or as an audio signal for a call of a user of the communication device 300, for example. The radio frequency module 1 transfers a radio frequency signal (reception signal and transmission signal) between the antenna 310 and the RF signal processing circuit 302 of the signal processing circuit 301.

Figure 1:
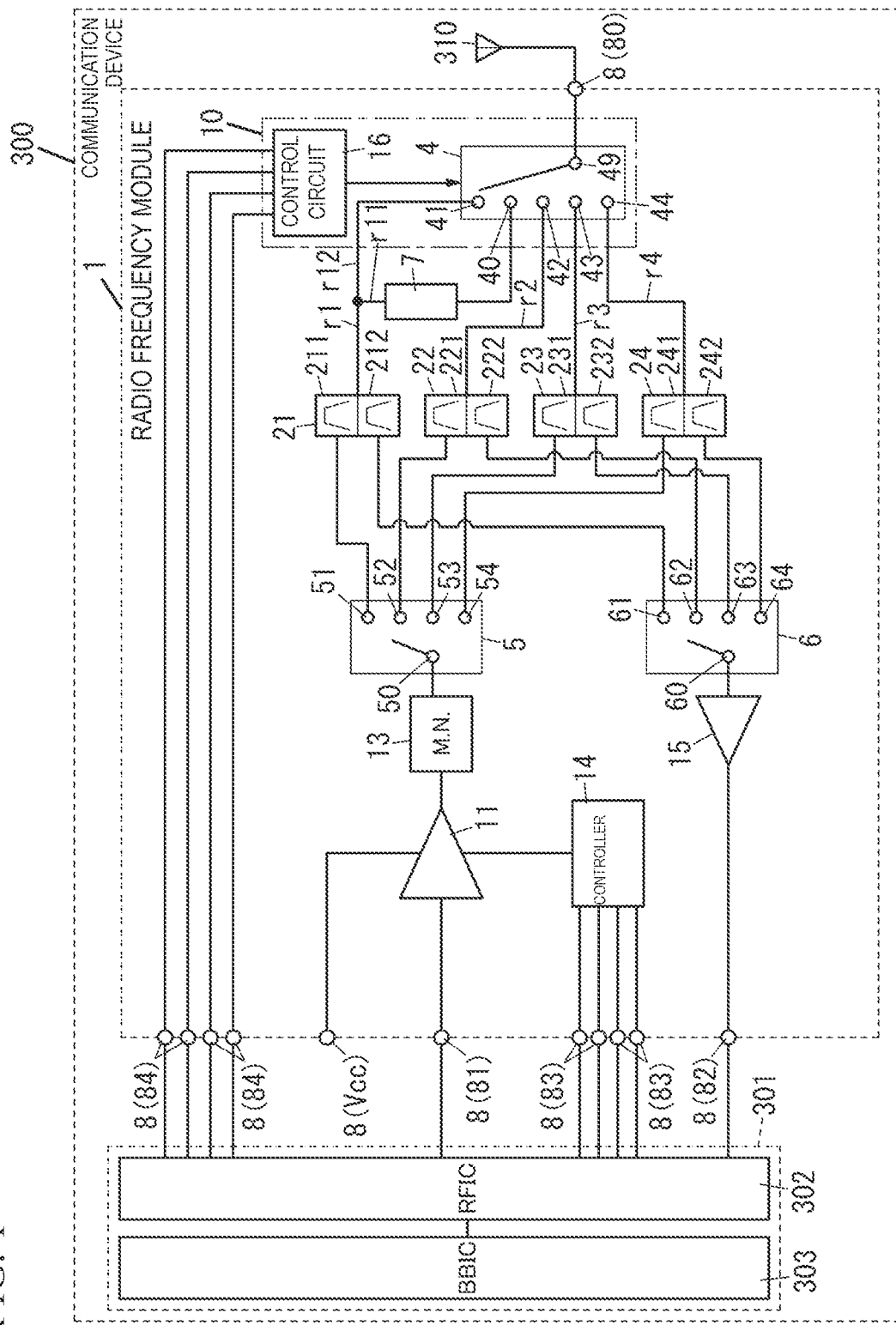
FIG. 1 is a circuit diagram of a radio frequency module according to Embodiment 1 and a communication device including the radio frequency module.
Figure 2:
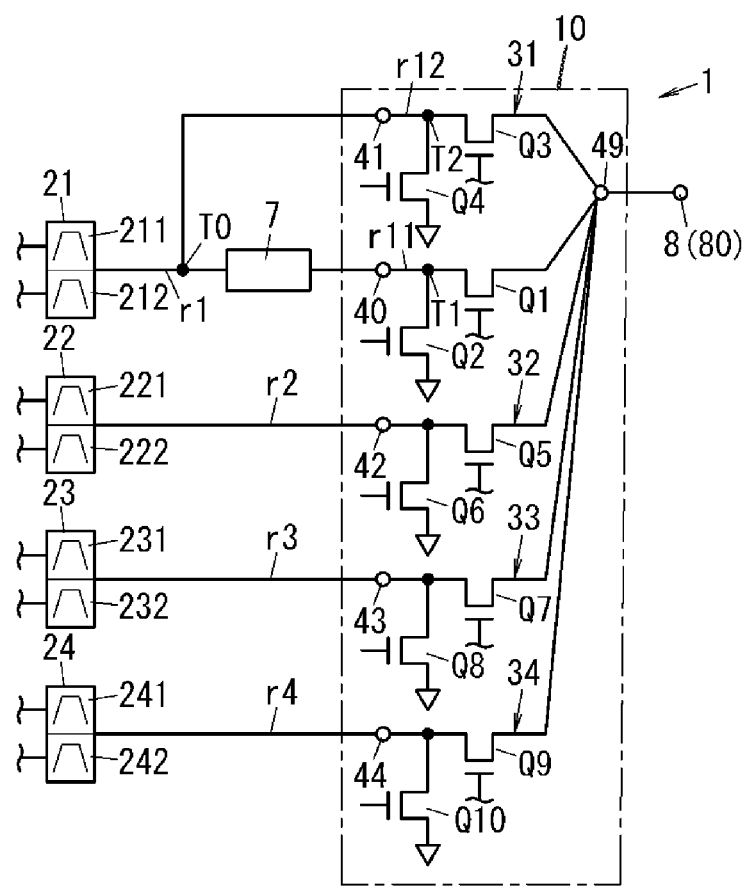
FIG. 2 is a circuit diagram of the radio frequency module according to Embodiment 1.
Figure 3:
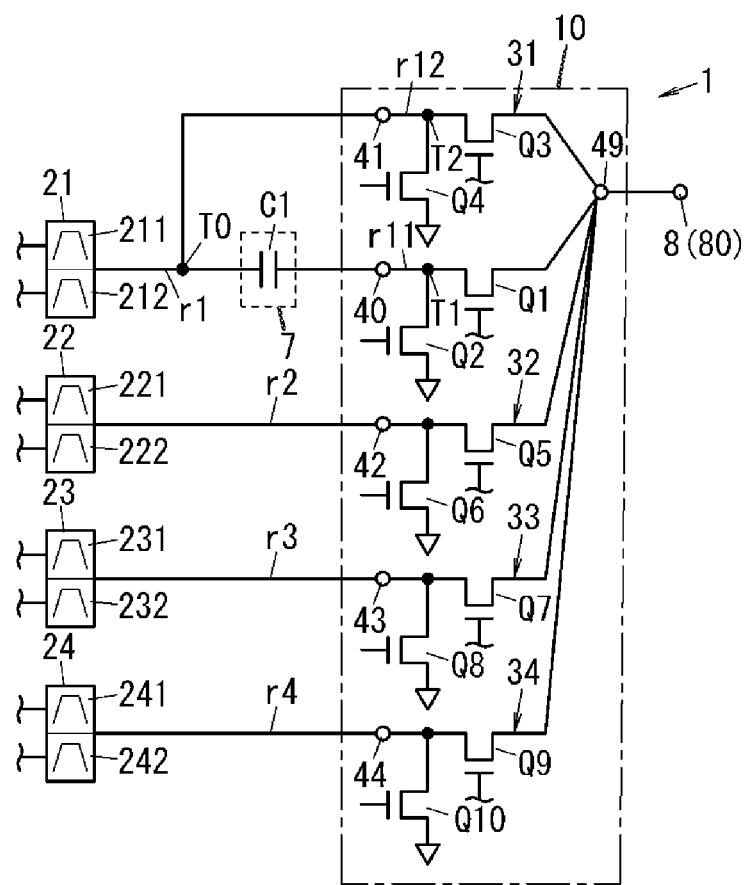
FIG. 3 is a circuit diagram of the radio frequency module according to Embodiment 1.
Figure 4:
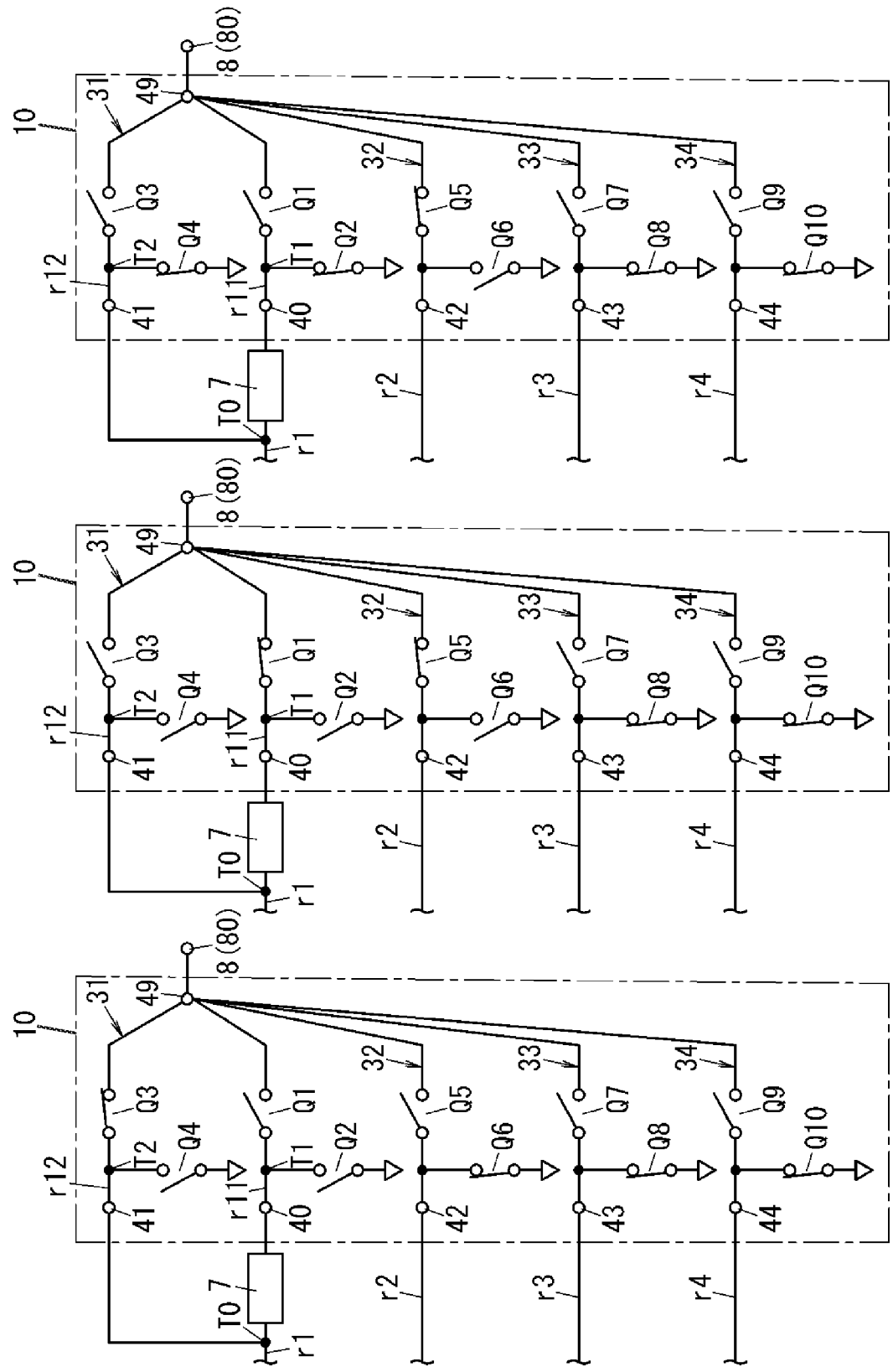
FIG. 4A to FIG. 4C are explanatory diagrams of the operation of the radio frequency module according to Embodiment 1.

The radio frequency module 1 according to Embodiment 1 includes an antenna terminal 80, a first filter 21, a second filter 22, and a switch circuit 31 as illustrated in FIG. 2. The antenna terminal 80 is connected to the antenna 310 (see FIG. 1). The first filter 21 is a filter having a pass band of a first frequency band. The second filter 22 is a filter having a pass band of a second frequency band different from the first frequency band. The switch circuit 31 is connected between the antenna terminal 80 and the first filter 21. The radio frequency module 1 is capable of operating in a first mode in which simultaneous transmission, simultaneous reception, or simultaneous transmission and reception using both the first filter 21 and the second filter 22 is possible, and in a second mode in which transmission or reception using only the first filter 21 out of the first filter 21 and the second filter 22 is possible. The first mode is a mode in which a radio frequency signal in the first frequency band and a radio frequency signal in the second frequency band are simultaneously communicated (simultaneous transmission, simultaneous reception, or simultaneous transmission and reception). The second mode is a mode in which only a radio frequency signal in the second frequency band is communicated. The switch circuit 31 includes a first switching element Q1, a second switching element Q2, a third switching element Q3, and a fourth switching element Q4. The first switching element Q1 is provided in a first path r11 that is usable between the antenna terminal 80 and the first filter 21 in the first mode. The second switching element Q2 is provided between the first path r11 and a ground. The third switching element Q3 is provided in a second path r12 that is usable between the antenna terminal 80 and the first filter 21 in the second mode. The fourth switching element Q4 is provided between the second path r12 and the ground. The radio frequency module 1 further includes a phase shifter 7. The phase shifter 7 is provided in the first path r11.

Hereinafter, the circuit configuration of the radio frequency module 1 will be described in more detail based on FIG. 1 to FIG. 3.

The first filter 21 is a duplexer including a transmission filter 211 and a reception filter 212, for example. The first frequency band which is the pass band of the first filter 21 includes a transmission band of a first communication band and a reception band of the first communication band, for example. A pass band of the transmission filter 211 includes the transmission band of the first communication band, for example. A pass band of the reception filter 212 includes the reception band of the first communication band, for example. The second filter 22 is a duplexer including a transmission filter 221 and a reception filter 222, for example. The second frequency band which is the pass band of the second filter 22 includes a transmission band of a second communication band and a reception band of the second communication band, for example. A pass band of the transmission filter 221 includes the transmission band of the second communication band. A pass band of the reception filter 222 includes the reception band of the second communication band. The first communication band is Band8, Band5, or Band1 of the 3GPP LTE standard, for example. When the first communication band is Band8, the second communication band is any one of Band20 and Band28A/Band28B of the 3GPP LTE standard, and n20 and n28A of 5G NR, for example. When the first communication band is Band5, the second communication band is any one of Band12 and Band13 of the 3GPP LTE standard, and n12 of 5G NR, for example. When the first communication band is Band1, the second communication band is any one of Band3 and Band1 of the 3GPP LTE standard, and n3 and n7 of 5G NR.

Further, the radio frequency module 1 according to Embodiment 1 further includes a second switch circuit 32 in addition to a first switch circuit 31 being the switch circuit 31, as illustrated in FIG. 2. The second switch circuit 32 is connected between the antenna terminal 80 and the second filter 22. The second switch circuit 32 includes a fifth switching element Q5 and a sixth switching element Q6. The fifth switching element Q5 is provided in a signal path r2 between the antenna terminal 80 and the second filter 22. The sixth switching element Q6 is provided between the signal path r2 and the ground. In the radio frequency module 1 according to Embodiment 1, the signal path r2 constitutes a third path.

Further, the radio frequency module 1 according to Embodiment 1 further includes a third filter 23 and a fourth filter 24 as illustrated in FIG. 2. The third filter 23 is a filter having a pass band of a third frequency band. The fourth filter 24 is a filter having a pass band of a fourth frequency band. The first to fourth frequency bands are different from each other in frequency band. The third filter 23 is a duplexer including a transmission filter 231 and a reception filter 232, for example. The fourth filter 24 is a duplexer including a transmission filter 241 and a reception filter 242, for example. The radio frequency module 1 further includes a third switch circuit 33 connected between the antenna terminal 80 and the third filter 23, and a fourth switch circuit 34 connected between the antenna terminal 80 and the fourth filter 24. The third switch circuit 33 includes a seventh switching element Q7 and an eighth switching element Q8. The seventh switching element Q7 is provided in a signal path r3 between the antenna terminal 80 and the third filter 23. The eighth switching element Q8 is provided between the signal path r3 and the ground. The fourth switch circuit 34 includes a ninth switching element Q9 and a tenth switching element Q10. The ninth switching element Q9 is provided in a signal path r4 between the antenna terminal 80 and the fourth filter 24. The tenth switching element Q10 is provided between the signal path r4 and the ground.

Further, the radio frequency module 1 further includes a power amplifier 11, a controller 14, an output matching circuit 13, and a low-noise amplifier 15 as illustrated in FIG. 1.

In addition, the radio frequency module 1 according to Embodiment 1 further includes a first switch 4 including the first switching element Q1 to the tenth switching element Q10 (see FIG. 2), a second switch 5, and a third switch 6.

Still further, the radio frequency module 1 includes multiple external connection terminals 8 including the antenna terminal 80 described above. The multiple external connection terminals 8 include an antenna terminal 80, a signal input terminal 81, a signal output terminal 82, multiple first control terminals 83, multiple second control terminals 84, multiple ground terminals 85 (see FIG. 5), and a power supply terminal Vcc. The communication device 300 further includes a circuit substrate on which the radio frequency module 1 is mounted. The circuit substrate is a printed wiring board, for example. The circuit substrate has a ground electrode to which ground electric potential is applied. The multiple ground terminals 85 are terminals that are electrically connected to the ground electrode of the circuit substrate included in the communication device 300 and are supplied with ground electric potential.

The power amplifier 11 has an input terminal and an output terminal. The power amplifier 11 amplifies a transmission signal in the first to fourth frequency bands inputted to the input terminal and outputs the amplified transmission signal from the output terminal. The input terminal of the power amplifier 11 is connected to the signal input terminal 81. The input terminal of the power amplifier 11 is connected to the signal processing circuit 301 through the signal input terminal 81. The signal input terminal 81 is a terminal to input a radio frequency signal (transmission signal), outputted from an external circuit (signal processing circuit 301, for example), to the radio frequency module 1. In the radio frequency module 1, the output terminal of the power amplifier 11 and each of the first filter 21 to the fourth filter 24 may be connected with the output matching circuit 13 and the second switch 5 interposed therebetween. The second switch 5 includes a common terminal 50 and multiple (four, for example) selection terminals 51 to 54. In the radio frequency module 1, the output terminal of the power amplifier 11 is connected to the common terminal 50 of the second switch 5 with the output matching circuit 13 interposed therebetween, and the four selection terminals 51, 52, 53, and 54 of the second switch 5 are connected to the four transmission filters 211, 221, 231, and 241 on a one-to-one basis. The power amplifier 11 is controlled by the controller 14.

The power amplifier 11 is a multistage amplifier including a driver stage amplifier and a final stage amplifier, for example. In the power amplifier 11, an input terminal of the driver stage amplifier is connected to the signal input terminal 81, an output terminal of the driver stage amplifier is connected to an input terminal of the final stage amplifier, and an output terminal of the final stage amplifier is connected to the output matching circuit 13. A power supply voltage is applied to the power amplifier 11 from the power supply terminal Vcc. The power amplifier 11 is not limited to the multistage amplifier, but may be an in-phase composite amplifier or a differential composite amplifier, for example.

The controller 14 is connected to the driver stage amplifier and an output stage amplifier of the power amplifier 11. The controller 14 is connected to the signal processing circuit 301 through multiple (four, for example) first control terminals 83. Each of the multiple first control terminals 83 is a terminal to input a control signal, outputted from an external circuit (signal processing circuit 301, for example), to the controller 14. The controller 14 controls the power amplifier 11 based on control signals acquired through the multiple first control terminals 83. The controller 14 controls the power amplifier 11 in accordance with a control signal from the RF signal processing circuit 302. Here, the controller 14 supplies a first bias current to the driver stage amplifier and a second bias current to the output stage amplifier based on the control signal from the RF signal processing circuit 302, for example.

The output matching circuit 13 is provided in a signal path between the output terminal of the power amplifier 11 and the common terminal 50 of the second switch 5. The output matching circuit 13 is a circuit for impedance matching between the power amplifier 11 and the four transmission filters 211, 221, 231, and 241. The output matching circuit 13 includes an inductor connected between the output terminal of the power amplifier 11 and the common terminal 50 of the second switch 5, for example. The output matching circuit 13 may include multiple inductors and multiple capacitors, for example.

The low-noise amplifier 15 has an input terminal and an output terminal. The low-noise amplifier 15 amplifies a reception signal in the first to fourth frequency bands inputted to the input terminal, and outputs the amplified reception signal from the output terminal. The input terminal of the low-noise amplifier 15 is connected to a common terminal 60 of the third switch 6. The radio frequency module 1 may include an input matching circuit provided between the input terminal of the low-noise amplifier 15 and the common terminal 60 of the third switch 6. The output terminal of the low-noise amplifier 15 is connected to the signal output terminal 82. The output terminal of the low-noise amplifier 15 is connected to the signal processing circuit 301 through the signal output terminal 82, for example. The signal output terminal 82 is a terminal to output a radio frequency signal (reception signal), outputted from the low-noise amplifier 15, to an external circuit (signal processing circuit 301, for example). In the radio frequency module 1, the input terminal of the low-noise amplifier 15 and the first filter 21 to the fourth filter 24 are connectable through the third switch 6. The third switch 6 has the common terminal 60 and multiple (four, for example) selection terminals 61 to 64. In the radio frequency module 1, the input terminal of the low-noise amplifier 15 is connected to the common terminal 60 of the third switch 6, and the four selection terminals 61, 62, 63, and 64 of the third switch 6 are connected to the four reception filters 212, 222, 232, and 242 on a one-to-one basis.

The first switch 4 has a common terminal 49 and five selection terminals 40 to 44. In the first switch 4, the common terminal 49 is connected to the antenna terminal 80. The radio frequency module 1 is not limited to a case that the common terminal 49 and the antenna terminal 80 are connected to each other with no other circuit element interposed therebetween, but the common terminal 49 and the antenna terminal 80 may be connected to each other with a low pass filter and a coupler interposed therebetween, for example. The selection terminal 40 is connected to the first filter 21 (a connection point of an output terminal of the transmission filter 211 and an input terminal of the reception filter 212 in the first filter 21). Here, the selection terminal 40 is connected to the first filter 21 with the phase shifter 7 described above and the like interposed therebetween. The selection terminal 41 is connected to the first filter 21 (the connection point of the output terminal of the transmission filter 211 and the input terminal of the reception filter 212 in the first filter 21). The selection terminal 42 is connected to the second filter 22 (a connection point of an output terminal of the transmission filter 221 and an input terminal of the reception filter 222 in the second filter 22). The selection terminal 43 is connected to the third filter 23 (a connection point of an output terminal of the transmission filter 231 and an input terminal of the reception filter 232 in the third filter 23). The selection terminal 44 is connected to the fourth filter 24 (a connection point of an output terminal of the transmission filter 241 and an input terminal of the reception filter 242 in the fourth filter 24). The first switch 4 is a switch capable of connecting at least one or more of the five selection terminals 40 to 44 and the common terminal 49, for example. Here, the first switch 4 is a switch capable of one-to-one and one-to-many connections, for example.

In the radio frequency module 1, a signal path r1 between the antenna terminal 80 and the first filter 21 includes the first path r11 and the second path r12 described above. In the first switch 4, part of the first path r11 is formed between the common terminal 49 and the selection terminal 40, and the first switching element Q1 is provided between the common terminal 49 and the selection terminal 40 in the part of the first path r11, as illustrated in FIG. 2. In the first switch 4, the second switching element Q2 is provided between the part of the first path r11 and the ground. The second switching element Q2 is connected to a path between the first switching element Q1 and the first filter 21 in the first path r11. More specifically, the second switching element Q2 is provided between the ground and a portion of the first path r11, the portion between the first switching element Q1 and the selection terminal 40, in the part of the first path r11. The fourth switching element Q4 is connected to a path between the third switching element Q3 and the first filter 21 in the second path r12. More specifically, the fourth switching element Q4 is provided between the ground and a portion of the second path r12, the portion between the third switching element Q3 and the selection terminal 41, in part of the second path r12.

Further, in the first switch 4, the part of the second path r12 described above is formed between the common terminal 49 and the selection terminal 41, and the third switching element Q3 is provided, between the common terminal 49 and the selection terminal 41, in the part of the second path r12. In addition, in the first switch 4, the fourth switching element Q4 is provided between the part of the second path r12 and the ground. The fourth switching element Q4 is connected to a path between the third switching element Q3 and the first filter 21 in the second path r12. More specifically, the fourth switching element Q4 is provided between the ground and a portion of the second path r12, the portion between the third switching element Q3 and the selection terminal 41, in the part of the second path r12.

Further, in the first switch 4, part of the signal path r2 described above is formed between the common terminal 49 and the selection terminal 42, and the fifth switching element Q5 is provided between the common terminal 49 and the selection terminal 42 in the part of the signal path r2. Further, in the first switch 4, the sixth switching element Q6 is provided between the part of the signal path r2 and the ground.

Further, in the first switch 4, part of the signal path r3 between the antenna terminal 80 and the third filter 23 is formed between the common terminal 49 and the selection terminal 43, and the seventh switching element Q7 is provided between the common terminal 49 and the selection terminal 43 in the part of the signal path r3. Further, in the first switch 4, the eighth switching element Q8 is provided between the part of the signal path r3 and the ground.

Further, in the first switch 4, part of the signal path r4 between the antenna terminal 80 and the fourth filter 24 is formed between the common terminal 49 and the selection terminal 44, and the ninth switching element Q9 is provided between the common terminal 49 and the selection terminal 44 in the part of the signal path r4. Further, in the first switch 4, the tenth switching element Q10 is provided between the part of the signal path r4 and the ground.

Each of the first switching element Q1 to the tenth switching element Q10 in the first switch 4 is a Filed Effect Transistor (FET). The radio frequency module 1 further includes a control circuit 16 that controls the first switch circuit 31. The control circuit 16 controls the first to fourth switching elements Q4 of the first switch circuit 31. Further, the control circuit 16 also controls the fifth switching element Q5 and the sixth switching element Q6 of the second switch circuit 32. In addition, the control circuit 16 also controls the seventh switching element Q7 and the eighth switching element Q8 of the third switch circuit 33. Still further, the control circuit 16 also controls the ninth switching element Q9 and the tenth switching element Q10 of the fourth switch circuit 34. In short, the control circuit 16 controls each of the first switching element Q1 to the tenth switching element Q10 to a conductive state (ON) or a non-conductive state (OFF). The control circuit 16 controls the first switching element Q1 to the tenth switching element Q10 of the first switch 4 based on control signals acquired through the multiple second control terminals 84. The control circuit 16 is a logic circuit that controls the first switch 4 in accordance with a control signal from the signal processing circuit 301. The control signal received from the RF signal processing circuit 302 by the control circuit 16 is, for example, a first command corresponding to carrier aggregation or dual connectivity of the first communication band and the second communication band, a second command corresponding to single communication in the first communication band, or the like. The radio frequency module 1 operates in the first mode when the control circuit 16 receives the first command, and operates in the second mode when the control circuit 16 receives the second command. The radio frequency module 1 includes a single IC chip 10 (see FIG. 5) including the first switch 4 and the control circuit 16.

The second switch 5 includes the common terminal 50 and the four selection terminals 51 to 54. The common terminal 50 is connected to the output terminal of the power amplifier 11 with the output matching circuit 13 interposed therebetween. The selection terminal 51 is connected to an input terminal of the transmission filter 211 (a transmission terminal of the duplexer constituting the first filter 21). The selection terminal 52 is connected to an input terminal of the transmission filter 221 (a transmission terminal of the duplexer constituting the second filter 22). The selection terminal 53 is connected to an input terminal of the transmission filter 231 (a transmission terminal of the duplexer constituting the third filter 23). The selection terminal 54 is connected to an input terminal of the transmission filter 241 (a transmission terminal of the duplexer constituting the fourth filter 24). The second switch 5 is a switch capable of connecting at least one or more of the four selection terminals 51 to 54 and the common terminal 50, for example. Here, the second switch 5 is a switch capable of one-to-one and one-to-many connections, for example.

The second switch 5 is controlled by the controller 14, for example. The second switch 5 changes over connection states between the common terminal 50 and the four selection terminals 51 to 54 in accordance with a control signal from the controller 14, for example. The second switch 5 is a switch Integrated Circuit (IC), for example.

The third switch 6 has a common terminal 60 and four selection terminals 61 to 64. The common terminal 60 is connected to an input terminal of the low-noise amplifier 15. The selection terminal 61 is connected to an output terminal of the reception filter 212 (a reception terminal of the duplexer constituting the first filter 21). The selection terminal 62 is connected to an output terminal of the reception filter 222 (a reception terminal of the duplexer constituting the second filter 22). The selection terminal 63 is connected to an output terminal of the reception filter 232 (a reception terminal of the duplexer constituting the third filter 23). The selection terminal 64 is connected to an output terminal of the reception filter 242 (a reception terminal of the duplexer constituting the fourth filter 24). The third switch 6 is a switch capable of connecting at least one or more of the four selection terminals 61 to 64 and the common terminal 60, for example. Here, the third switch 6 is a switch capable of one-to-one and one-to-many connections, for example.

The third switch 6 is controlled by the controller 14, for example. The third switch 6 changes over connection states between the common terminal 60 and the four selection terminals 61 to 64 in accordance with a control signal from the controller 14, for example. The third switch 6 is a switch IC, for example.

The phase shifter 7 is provided in the first path r11 of the signal path r1, and shifts the phase of a radio frequency signal. The phase shifter 7 also serves as a matching circuit for impedance matching between the first filter 21 and the antenna terminal 80 in the first mode. The phase shifter 7 includes a capacitor C1 as illustrated in FIG. 3. The capacitor C1 is provided in the first path r11 between the first switching element Q1 and the first filter 21. More specifically, the capacitor C1 is provided between a connection point T1 of the first switching element Q1 and the second switching element Q2, and a connection point T0, being connected to the first filter 21, of the first path r11 and the second path r12 in the signal path r1. More specifically, the capacitor C1 is provided between the selection terminal 40 to which the first switching element Q1 is connected, and the connection point T0. In the radio frequency module 1 according to Embodiment 1, a connection point T2 of the third switching element Q3 and the fourth switching element Q4 is connected to the connection point T0, with no phase shifter 7 interposed therebetween.

In the radio frequency module 1, for example, the first filter 21 is designed to have predetermined frequency characteristics when the radio frequency module 1 operates in the second mode, and the phase shifter 7 is designed to perform impedance matching between the first filter 21 and the antenna terminal 80 when the radio frequency module 1 operates in the first mode.

(1.2) Operation of Radio Frequency Module

As described above, the radio frequency module 1 is capable of operating in the first mode in which simultaneous transmission, simultaneous reception, or simultaneous transmission and reception using both the first filter 21 and the second filter 22 is possible, and in the second mode in which transmission or reception using only the first filter 21 out of the first filter 21 and the second filter 22 is possible. Further, the radio frequency module 1 is capable of operating also in a third mode in which transmission or reception using only the second filter 22 out of the first filter 21 and the second filter 22 is possible. In the radio frequency module 1, when simultaneous transmission using both the first filter 21 and the second filter 22 is performed in the first mode, the common terminal 50 of the second switch 5 is connected to the two selection terminals 51 and 52. In the radio frequency module 1, when simultaneous reception using both the first filter 21 and the second filter 22 is performed in the first mode, the common terminal 60 of the third switch 6 is connected to the two selection terminals 61 and 62. Further, in the radio frequency module 1, when transmission is performed using only the first filter 21 in the second mode, the common terminal 50 of the second switch 5 is connected to the one selection terminal 51. In addition, in the radio frequency module 1, when reception is performed using only the second filter 22 in the third mode, the common terminal 60 of the third switch 6 is connected to the one selection terminal 62. The second switch 5 and the third switch 6 are controlled by the controller 14, for example. Further, the controller 14 controls the second switch 5 and the third switch 6 based on a control signal from the signal processing circuit 301, for example. Note that the controller 14 also controls the power amplifier 11.

Hereinafter, an operation example of the radio frequency module 1 will be described with reference to FIG. 4A to FIG. 4C. In FIG. 4A to FIG. 4C, in order to easily recognize the conductive state (ON) and the non-conductive state (OFF) of the first switching element Q1 to the tenth switching element Q10, graphic symbols of the first switching element Q1 to the tenth switching element Q10 are represented by graphic symbols of switches instead of graphic symbols of FETs. In a case that each of the first switching element Q1 to the tenth switching element Q10 is an FET, each of the first switching element Q1 to the tenth switching element Q10 is in the conductive state when a gate-source voltage of the FET is equal to or higher than a gate-threshold voltage, and is in the non-conductive state when the gate-source voltage of the FET is lower than the gate-threshold voltage. The control circuit 16 controls the first to the tenth switching elements Q10 by controlling the gate-source voltage of the FET constituting each of the first switching element Q1 to the tenth switching element Q10. The control circuit 16 controls the first switching element Q1 to the tenth switching element Q10 based on a control signal from the signal processing circuit 301, for example. In the radio frequency module 1, upon receiving the first command from the signal processing circuit 301, the control circuit 16 controls the first switching element Q1 to the tenth switching element Q10 so as to deal with the first mode. Further, upon receiving the second command from the signal processing circuit 301, the control circuit 16 controls the first switching element Q1 to the tenth switching element Q10 so as to deal with the second mode.

In the radio frequency module 1, in the first mode in which simultaneous transmission, simultaneous reception, or simultaneous transmission and reception is performed using both the first filter 21 and the second filter 22, each of the first switching element Q1 to the tenth switching element Q10 is in a state illustrated in FIG. 4B. Further, in the radio frequency module 1, in the second mode in which transmission or reception is performed using only the first filter 21 out of the first filter 21 and the second filter 22, each of the first switching element Q1 to the tenth switching element Q10 is in a state illustrated in FIG. 4A. In addition, in the radio frequency module 1, in the third mode in which transmission or reception is performed using only the second filter 22 out of the first filter 21 and the second filter 22, each of the first switching element Q1 to the tenth switching element Q10 is in a state illustrated in FIG. 4C.

In the first mode, as illustrated in FIG. 4B, in the first switch circuit 31, the first switching element Q1 in the first path r11 is in the conductive state (ON), the third switching element Q3 in the second path r12 is in the non-conductive state (OFF), and the second switching element Q2 and the fourth switching element Q4 are in the non-conductive state (OFF). In the radio frequency module 1, in the first mode, since the fourth switching element Q4 is in the non-conductive state (OFF), the second path r12 is not electrically connected to the ground, and is in an open state with respect to the ground. This makes it possible to prevent that a radio frequency signal is not able to pass through the first path r11 during the simultaneous transmission.

Further, in the first mode, as illustrated in FIG. 4B, in the second switch circuit 32, the fifth switching element Q5 in the signal path r2 is in the conductive state (ON), and the sixth switching element Q6 between the signal path r2 and the ground is in the non-conductive state (OFF). In addition, in the first mode, as illustrated in FIG. 4B, in the third switch circuit 33, the seventh switching element Q7 in the signal path r3 is in the non-conductive state (OFF), and the eighth switching element Q8 between the signal path r3 and the ground is in the conductive state (ON). Since the eighth switching element Q8 is in the conductive state (ON), the signal path r3 of the third switch circuit 33 is electrically connected to the ground (is in a state being short-circuited to the ground). In addition, in the first mode, as illustrated in FIG. 4B, in the fourth switch circuit 34, the ninth switching element Q9 in the signal path r4 is in the non-conductive state (OFF), and the tenth switching element Q10 between the signal path r4 and the ground is in the conductive state (ON). Since the tenth switching element Q10 is in the conductive state (ON), the signal path r4 of the fourth switch circuit 34 is electrically connected to the ground (is in a state being short-circuited to the ground).

In the second mode, as illustrated in FIG. 4A, in the first switch circuit 31, the first switching element Q1 in the first path r11 is in the non-conductive state (OFF), the third switching element Q3 in the second path r12 is in the conductive state (ON), and the second switching element Q2 and the fourth switching element Q4 are in the non-conductive state (OFF). In the radio frequency module 1, in the second mode, since the second switching element Q2 is in the non-conductive state (OFF), the first path r11 is not electrically connected to the ground (is in an open state with respect to the ground). This makes it possible to prevent that the second path r12 is connected to the ground through the phase shifter 7 and the second switching element Q2, and to suppress the deterioration in characteristics. Further, since the fourth switching element Q4 is in the non-conductive state (OFF), the second path r12 is not electrically connected to the ground (is in an open state with respect to the ground).

In the second mode, as illustrated in FIG. 4A, in the second switch circuit 32, the fifth switching element Q5 in the signal path r2 is in the non-conductive state (OFF), and the sixth switching element Q6 between the signal path r2 and the ground is in the conductive state (ON). Since the sixth switching element Q6 is in the conductive state (ON), the signal path r2 of the second switch circuit 32 is electrically connected to the ground (is in a state being short-circuited to the ground). Further, in the second mode, as illustrated in FIG. 4A, in the third switch circuit 33, the seventh switching element Q7 in the signal path r3 is in the non-conductive state (OFF), and the eighth switching element Q8 between the signal path r3 and the ground is in the conductive state (ON). Since the eighth switching element Q8 is in the conductive state (ON), the signal path r3 of the third switch circuit 33 is electrically connected to the ground (is in a state being short-circuited to the ground). Further, in the second mode, as illustrated in FIG. 4A, in the fourth switch circuit 34, the ninth switching element Q9 in the signal path r4 is in the non-conductive state (OFF), and the tenth switching element Q10 between the signal path r4 and the ground is in the conductive state (ON). Since the tenth switching element Q10 is in the conductive state (ON), the signal path r4 of the fourth switch circuit 34 is electrically connected to the ground (is in a state being short-circuited to the ground).

In the third mode, as illustrated in FIG. 4C, in the first switch circuit 31, the first switching element Q1 in the first path r11 is in the non-conductive state (OFF), the third switching element Q3 in the second path r12 is in the non-conductive state (OFF), and the second switching element Q2 and the fourth switching element Q4 are in the conductive state (ON). Since the second switching element Q2 is in the conductive state (ON), the first path r11 is electrically connected to the ground (is in a state being short-circuited to the ground). Further, since the fourth switching element Q4 is in the conductive state (ON), the second path r12 is electrically connected to the ground (is in a state being short-circuited to the ground). In the radio frequency module 1, in the third mode, each of the second switching element Q2 and the fourth switching element Q4 is in the conductive state. This makes it possible to suppress the deterioration in characteristics due to the influence of parasitic capacitance in the non-conductive state of each of the second switching element Q2 and the fourth switching element Q4.

In the third mode, as illustrated in FIG. 4C, in the second switch circuit 32, the fifth switching element Q5 in the signal path r2 is in the conductive state (ON), and the sixth switching element Q6 between the signal path r2 and the ground is in the non-conductive state (OFF). Further, in the third mode, as illustrated in FIG. 4C, in the third switch circuit 33, the seventh switching element Q7 in the signal path r3 is in the non-conductive state (OFF), and the eighth switching element Q8 is in the conductive state (ON). In addition, in the third mode, as illustrated in FIG. 4C, in the fourth switch circuit 34, the ninth switching element Q9 in the signal path r4 is in the non-conductive state (OFF), and the tenth switching element Q10 is in the conductive state (ON).

Hereinafter, the operation of the control circuit 16 will be described in more detail.

Upon receiving the first command, as illustrated in FIG. 4B described above, the control circuit 16 controls the first switching element Q1 and the fifth switching element Q5 to be in the conductive state, controls the second switching element Q2, the third switching element Q3, the fourth switching element Q4, the sixth switching element Q6, the seventh switching element Q7, and the ninth switching element Q9 to be in the non-conductive state, and controls the eighth switching element Q8 and the tenth switching element Q10 to be in the conductive state. Therefore, in the first mode, the control circuit 16 brings both the third switching element Q3 and the fourth switching element Q4 corresponding to the second path r12 into the non-conductive state.

Further, upon receiving the second command, as illustrated in FIG. 4A described above, the control circuit 16 controls the third switching element Q3 to be in the conductive state, controls the first switching element Q1, the second switching element Q2, the fourth switching element Q4, the fifth switching element Q5, the seventh switching element Q7, and the ninth switching element Q9 to be in the non-conductive state, and controls the eighth switching element Q8 and the tenth switching element Q10 to be in the conductive state. Therefore, in the second mode, the control circuit 16 brings both the first switching element Q1 and the second switching element Q2 into the non-conductive state.

Hereinafter, for the convenience of description, each of the first switching element Q1, the third switching element Q3, the fifth switching element Q5, the seventh switching element Q7, and the ninth switching element Q9 may sometimes be referred to as a series switch without necessarily being distinguished from one another. Further, each of the second switching element Q2, the fourth switching element Q4, the sixth switching element Q6, the eighth switching element Q8, and the tenth switching element Q10 may sometimes be referred to as a shunt switch without necessarily being distinguished from one another. The radio frequency module 1 includes multiple (five) pairs of a series switch and a shunt switch. The multiple pairs include a pair of the first switching element Q1 and the second switching element Q2, a pair of the third switching element Q3 and the fourth switching element Q4, a pair of the fifth switching element Q5 and the sixth switching element Q6, a pair of the seventh switching element Q7 and the eighth switching element Q8, and a pair of the ninth switching element Q9 and the tenth switching element Q10.

When the radio frequency module 1 operates in the first mode, the control circuit 16 brings both the series switch and the shunt switch corresponding to the second path r12 into the non-conductive state, and exclusively controls the series switch and the shunt switch in a pair of the series switch and the shunt switch corresponding to each of the first path r11, the signal path r2, the signal path r3, and the signal path r4. "Exclusively controls the series switch and the shunt switch in a pair" means that, with respect to a pair of a series switch and a shunt switch, one of the series switch and the shunt switch is controlled to be in the conductive state, and the other of the series switch and the shunt switch is controlled to be in the non-conductive state. Further, when the radio frequency module 1 operates in the second mode, the control circuit 16 brings both the series switch and the shunt switch corresponding to the first path r11 into the non-conductive state, and exclusively controls the series switch and the shunt switch in a pair of the series switch and the shunt switch corresponding to each of the second path r12, the signal path r2 (third path), the signal path r3, and the signal path r4.

(1.3) Structure of Radio Frequency Module

Hereinafter, the structure of the radio frequency module 1 will be described with reference to FIG. 5.

The radio frequency module 1 includes a mounting substrate 9 on which multiple circuit components (first filter 21, second filter 22, IC chip 10, and the like) of the radio frequency module 1 are mounted. Further, the radio frequency module 1 includes multiple external connection terminals 8. In addition, the radio frequency module 1 further includes a first resin layer 17, a second resin layer 18, and a shield layer 19.

The mounting substrate 9 has a first main surface 91 and a second main surface 92 opposed to each other in a thickness direction D1 of the mounting substrate 9. The mounting substrate 9 is a multilayer substrate including multiple dielectric layers and multiple conductive layers, for example. The multiple dielectric layers and the multiple conductive layers are laminated in the thickness direction D1 of the mounting substrate 9. The multiple conductive layers are formed in a predetermined pattern designated for each layer. Each of the multiple conductive layers includes one or multiple conductive portions in one plane orthogonal to the thickness direction D1 of the mounting substrate 9. The material of each conductive layer is copper, for example. The multiple conductive layers include a ground layer. In the radio frequency module 1, the multiple ground terminals 85 and the ground layer are electrically connected to each other through via conductors or the like provided to the mounting substrate 9. The mounting substrate 9 is a Low Temperature Co-fired Ceramics (LTCC) substrate, for example. The mounting substrate 9 is not limited to the LTCC substrate, but may be a printed wiring board, a High Temperature Co-fired Ceramics (HTCC) substrate, or a resin multilayer substrate, for example.

Further, the mounting substrate 9 is not limited to the LTCC substrate, but may be a wiring structure body, for example. The wiring structure body is a multilayer structure body, for example. The multilayer structure body includes at least one insulation layer and at least one conductive layer. The insulation layer is formed in a predetermined pattern. When there are multiple insulation layers, the multiple insulation layers are formed in a predetermined pattern designated for each layer. The conductive layer is formed in a predetermined pattern different from the predetermined pattern of the insulation layer. When there are multiple conductive layers, the multiple conductive layers are formed in a predetermined pattern designated for each layer. The conductive layer may include one or multiple redistribution portions. In the wiring structure body, a first surface, of two surfaces opposed to each other in a thickness direction of the multilayer structure body, is the first main surface 91 of the mounting substrate 9, and a second surface is the second main surface 92 of the mounting substrate 9. The wiring structure body may be an interposer, for example. The interposer may be made of a silicon substrate, or may be a substrate formed of multiple layers.

The first main surface 91 and the second main surface 92 of the mounting substrate 9 are separated from each other in the thickness direction D1 of the mounting substrate 9, and intersect with the thickness direction D1 of the mounting substrate 9. The first main surface 91 of the mounting substrate 9 is orthogonal to the thickness direction D1 of the mounting substrate 9, for example, but may include a side surface of a conductive portion or the like as a surface not orthogonal to the thickness direction D1, for example. Further, the second main surface 92 of the mounting substrate 9 is orthogonal to the thickness direction D1 of the mounting substrate 9, for example, but may include a side surface of a conductive portion or the like as a surface not orthogonal to the thickness direction D1, for example. In addition, on the first main surface 91 and the second main surface 92 of the mounting substrate 9, a fine irregularity, a concave portion, or a convex portion may be formed. For example, when a concave portion is formed in the first main surface 91 of the mounting substrate 9, an inner surface of the concave portion is included in the first main surface 91.

In the radio frequency module 1 according to Embodiment 1, first group circuit components among the multiple circuit components are mounted on the first main surface 91 of the mounting substrate 9. The first group circuit components include the first filter 21 to the fourth filter 24 (see FIG. 1), the power amplifier 11, a circuit element of the output matching circuit 13 (see FIG. 1), and a circuit element (capacitor C1) of the phase shifter 7, for example. The capacitor C1 is a surface mount capacitor, for example. "The circuit component is mounted on the first main surface 91 of the mounting substrate 9" includes that the circuit component is disposed on (mechanically connected to) the first main surface 91 of the mounting substrate 9, and that the circuit component is electrically connected to (an appropriate conductive portion of) the mounting substrate 9. In the radio frequency module 1, second group circuit components among the multiple circuit components are mounted on the second main surface 92 of the mounting substrate 9. The second group circuit components include the IC chip 10 including the first switch 4 and the control circuit 16, the second switch 5 (see FIG. 1), the third switch 6 (see FIG. 1), the controller 14 (see FIG. 1), and the low-noise amplifier 15 (see FIG. 1). "The circuit component is mounted on the second main surface 92 of the mounting substrate 9" includes that the circuit component is disposed on (mechanically connected to) the second main surface 92 of the mounting substrate 9, and that the circuit component is electrically connected to (an appropriate conductive portion of) the mounting substrate 9. The radio frequency module 1 may include a circuit element provided in the mounting substrate 9, not limited to the circuit components mounted on the mounting substrate 9.

Each of the multiple transmission filters 211, 221, 231, and 241 is an acoustic wave filter including multiple Surface Acoustic Wave (SAW) resonators. The acoustic wave filter is a surface acoustic wave filter using a surface acoustic wave, for example. Each of the multiple reception filters 212, 222, 232, and 242 is an acoustic wave filter including the multiple SAW resonators. The acoustic wave filter is a surface acoustic wave filter using a surface acoustic wave, for example. The first filter 21 is a single circuit component (duplexer) including the transmission filter 211 and the reception filter 212. The second filter 22 is a single circuit component (duplexer) including the transmission filter 221 and the reception filter 222. The third filter 23 is a single circuit component (duplexer) including the transmission filter 231 and the reception filter 232. The fourth filter 24 is a single circuit component (duplexer) including the transmission filter 241 and the reception filter 242. Each of the first filter 21 to the fourth filter 24 has a rectangular shape in a plan view from the thickness direction D1 of the mounting substrate 9, but is not limited thereto, and may have a square shape, for example.

The power amplifier 11 is a power amplification IC chip. The power amplifier 11 is flip-chip mounted on the first main surface 91 of the mounting substrate 9. An outer peripheral shape of the power amplifier 11 is a quadrangular shape, in a plan view from the thickness direction D1 of the mounting substrate 9. Each of the driver stage amplifier and the final stage amplifier in the power amplifier 11 includes an amplification transistor. The amplification transistor is a Heterojunction Bipolar Transistor (HBT), for example. In the case above, the power amplification IC chip constituting the power amplifier 11 is a GaAs-based IC chip, for example. The amplification transistor is not limited to the bipolar transistor such as the HBT, but may be a Field Effect Transistor (FET), for example. The FET is Metal-Oxide-Semiconductor Field Effect Transistor (MOSFET), for example. The power amplification IC chip constituting the power amplifier 11 is not limited to the GaAs-based IC chip, but may be a Si-based IC chip, a SiGe-based IC chip, or a GaN-based IC chip, for example.

The inductor included in the output matching circuit 13 is a chip inductor, and is mounted on the first main surface 91 of the mounting substrate 9, for example.

The IC chip 10 including the first switch 4 and the control circuit 16 is a Si-based IC chip, for example. The IC chip 10 is flip-chip mounted on the second main surface 92 of the mounting substrate 9. An outer peripheral shape of the IC chip 10 is a quadrangular shape, in a plan view from the thickness direction D1 of the mounting substrate 9.

The low-noise amplifier 15 is flip-chip mounted on the second main surface 92 of the mounting substrate 9. In the radio frequency module 1 according to Embodiment 1, a Si-based IC chip including the low-noise amplifier 15, the second switch 5, and the third switch 6 may be mounted on the second main surface 92 of the mounting substrate 9. The low-noise amplifier 15 includes a field effect transistor as an amplification transistor. The amplification transistor in the low-noise amplifier 15 is not limited to the field effect transistor, but may be the bipolar transistor, for example.

The multiple external connection terminals 8 are disposed on the second main surface 92 of the mounting substrate 9. "The external connection terminal 8 is disposed on the second main surface 92 of the mounting substrate 9" includes that the external connection terminal 8 is mechanically connected to the second main surface 92 of the mounting substrate 9, and that the external connection terminal 8 is electrically connected to (an appropriate conductive portion of) the mounting substrate 9. The material of the multiple external connection terminals 8 is metal (copper, a copper alloy, or the like, for example), for example. Each of the multiple external connection terminals 8 is a columnar electrode. The columnar electrode is a cylindrical electrode, for example. The multiple external connection terminals 8 are bonded to the conductive portion of the mounting substrate 9 by solder, for example, but are not limited thereto. The external connection terminals 8 may be bonded using a conductive adhesive (conductive paste, for example), or may directly be bonded, for example.

The multiple external connection terminals 8 include the antenna terminal 80, the signal input terminal 81 (see FIG. 1), the signal output terminal 82 (see FIG. 1), the multiple first control terminals 83 (see FIG. 1), the multiple second control terminals 84 (see FIG. 1), and the multiple ground terminals 85. The multiple ground terminals 85 are electrically connected to the ground layer of the mounting substrate 9. The ground layer is a circuit ground of the radio frequency module 1, and the multiple circuit components of the radio frequency module 1 include circuit components electrically connected to the ground layer.

The first resin layer 17 is disposed on the first main surface 91 of the mounting substrate 9. The first resin layer 17 covers each of the first group circuit components mounted on the first main surface 91 of the mounting substrate 9 among the multiple circuit components. The first resin layer 17 includes resin (epoxy resin, for example). The first resin layer 17 may contain a filler in addition to resin.

The second resin layer 18 covers an outer peripheral surface of each of the second group circuit components mounted on the second main surface 92 of the mounting substrate 9 and the multiple external connection terminals 8.

The second resin layer 18 includes resin (epoxy resin, for example). The second resin layer 18 may contain a filler in addition to resin. The material of the second resin layer 18 may be the same as the material of the first resin layer 17, or may be different from the material of the first resin layer 17.

The shield layer 19 covers the first resin layer 17. The shield layer 19 has conductivity. The shield layer 19 has a multilayer structure in which multiple metal layers are laminated, but is not limited thereto, and may have one metal layer. The metal layer includes one or more types of metal. The shield layer 19 covers a main surface 171 of the first resin layer 17 on a side opposite to the mounting substrate 9 side, an outer peripheral surface 173 of the first resin layer 17, and an outer peripheral surface 93 of the mounting substrate 9. Further, the shield layer 19 also covers an outer peripheral surface 183 of the second resin layer 18. The shield layer 19 is in contact with at least part of an outer peripheral surface of the ground layer included in the mounting substrate 9. As a result, the electric potential of the shield layer 19 may be made equal to the electric potential of the ground layer. In the radio frequency module 1, main surfaces, of some circuit components among the first group circuit components mounted on the first main surface 91 of the mounting substrate 9, on a side opposite to the mounting substrate 9 side, may be in contact with the shield layer 19.

In the radio frequency module 1, the circuit element (capacitor C1) of the phase shifter 7 is mounted on the first main surface 91 of the mounting substrate 9, and the IC chip 10 including the switch circuit 31 (see FIG. 2 and FIG. 3) is mounted on the second main surface 92 of the mounting substrate 9. In the radio frequency module 1, the circuit element (capacitor C1) of the phase shifter 7 overlaps with the IC chip 10 in a plan view from the thickness direction D1 of the mounting substrate 9. In the radio frequency module 1, the whole of the circuit element (capacitor C1) of the phase shifter 7 overlaps with part of the IC chip 10 in a plan view from the thickness direction D1 of the mounting substrate 9. However, without necessarily being limited to this, part of the circuit element (capacitor C1) of the phase shifter 7 may overlap with part of the IC chip 10, or the whole of the circuit element (capacitor C1) of the phase shifter 7 may overlap with the whole of the IC chip 10.

In the radio frequency module 1, the first filter 21 is positioned between the power amplifier 11 and the circuit element (capacitor C1) of the phase shifter 7 in a plan view from the thickness direction D1 of the mounting substrate 9.

In the radio frequency module 1, the circuit element (capacitor C1) of the phase shifter 7 is adjacent to the first filter 21 in a plan view from the thickness direction D1 of the mounting substrate 9. "The circuit element of the phase shifter 7 is adjacent to the first filter 21" means that there is no other circuit component between the circuit element of the phase shifter 7 and the first filter 21, and the circuit element of the phase shifter 7 and the first filter 21 are adjacent to each other in a plan view from the thickness direction D1 of the mounting substrate 9.

In the radio frequency module 1, part of the first filter 21 overlaps with part of the IC chip 10 in a plan view from the thickness direction D1 of the mounting substrate 9. However, without necessarily being limited to this, it is acceptable that the first filter 21 does not overlap with the IC chip 10.

In the radio frequency module 1, the power amplifier 11 and other circuit components do not overlap with each other in a plan view from the thickness direction D1 of the mounting substrate 9.

(2) Effect (2.1) Radio Frequency Module

The radio frequency module 1 according to Embodiment 1 includes the antenna terminal 80, the first filter 21, the second filter 22, and the switch circuit 31. The first filter 21 is a filter having a pass band of the first frequency band. The second filter 22 is a filter having a pass band of the second frequency band different from the first frequency band. The switch circuit 31 is connected between the antenna terminal 80 and the first filter 21. The radio frequency module 1 is capable of operating in the first mode in which simultaneous transmission, simultaneous reception, or simultaneous transmission and reception using both the first filter 21 and the second filter 22 is possible, and in the second mode in which transmission or reception using only the first filter 21 out of the first filter 21 and the second filter 22 is possible. The switch circuit 31 includes the first switching element Q1, the second switching element Q2, the third switching element Q3, and the fourth switching element Q4. The first switching element Q1 is provided in the first path r11 that is usable between the antenna terminal 80 and the first filter 21 in the first mode. The second switching element Q2 is provided between the first path r11 and the ground. The third switching element Q3 is provided in the second path r12 that is usable between the antenna terminal 80 and the first filter 21 in the second mode. The fourth switching element Q4 is provided between the second path r12 and the ground. The radio frequency module 1 further includes the phase shifter 7. The phase shifter 7 is provided in the first path r11 and changes the phase of a radio frequency signal.

In the radio frequency module 1 according to Embodiment 1, it is possible to improve the isolation between the first path rill and the second path r12. In the radio frequency module 1 according to Embodiment 1, since the switch circuit 31 includes the second switching element Q2 and the fourth switching element Q4, it is possible to improve the isolation between the signal path r2 (third path) on which the second filter 22 is provided and the first path r11, and the isolation between the signal path r2 (third path) on which the second filter 22 is provided and the second path r12. When the radio frequency module 1 according to Embodiment 1 operates in the first mode, both the third switching element Q3 and the fourth switching element Q4 corresponding to the second path r12 are in the non-conductive state, and out of the first switching element and the second switching element Q2 corresponding to the first path r11, the first switching element Q1 is in the conductive state, and the second switching element Q2 is in the non-conductive state. Therefore, in the radio frequency module 1 according to Embodiment 1, out of the fifth switching element Q5 and the sixth switching element Q6 corresponding to the third path (signal path r2), the fifth switching element Q5 is in the conductive state and the sixth switching element Q6 is in the non-conductive state. This makes it possible to improve the isolation between the first path r11 and the third path r2. Further, when the radio frequency module 1 according to Embodiment 1 operates in the second mode, both the first switching element Q1 and the second switching element Q2 corresponding to the first path r11 are in the non-conductive state, and out of the third switching element Q3 and the fourth switching element Q4 corresponding to the second path r12, the third switching element Q1 is in the conductive state and the fourth switching element Q4 is in the non-conductive state. Therefore, in the radio frequency module 1 according to Embodiment 1, out of the fifth switching element Q5 and the sixth switching element Q6 corresponding to the third path (signal path r2), the fifth switching element Q5 is in the conductive state and the sixth switching element Q6 is in the non-conductive state, for example. This makes it possible to improve the isolation between the second path r12 and the third path r2.

Further, in the radio frequency module 1 according to Embodiment 1, when one of the first switching element Q1 and the third switching element Q3 is in the conductive state and the other of the first switching element Q1 and the third switching element Q3 is in the non-conductive state, the second switching element Q2 and the fourth switching element Q4 are in the non-conductive state. As a result, in the radio frequency module 1 according to Embodiment 1, it is possible to suppress the deterioration in characteristics when operating in each of the first mode and the second mode.

Further, the radio frequency module 1 further includes a second switch circuit 32 connected between the antenna terminal 80 and the second filter 22 in addition to the first switch circuit 31 being the switch circuit 31. In the second switch circuit 32, the fifth switching element Q5 is provided in the signal path r2 (third path) between the antenna terminal 80 and the second filter 22, and the sixth switching element Q6 is provided between the signal path r2 and the ground. As a result, in the radio frequency module 1 according to Embodiment 1, it is possible to improve each of the isolation between the first path r11 and the signal path r2, and the isolation between the second path r12 and the signal path r2.

(2.2) Communication Device

The communication device 300 according to Embodiment 1 includes the radio frequency module 1 and the signal processing circuit 301. The signal processing circuit 301 is connected to the radio frequency module 1.

Since the communication device 300 according to Embodiment 1 includes the radio frequency module 1, it is possible to improve the isolation between the first path r11 and the second path r12.

The multiple electronic components constituting the signal processing circuit 301 may be mounted on the circuit substrate described above, or may be mounted on a circuit substrate (second circuit substrate) different from the circuit substrate (first circuit substrate) on which the radio frequency module 1 is mounted, for example.

(3) Modification of Radio Frequency Module

Figure 6:
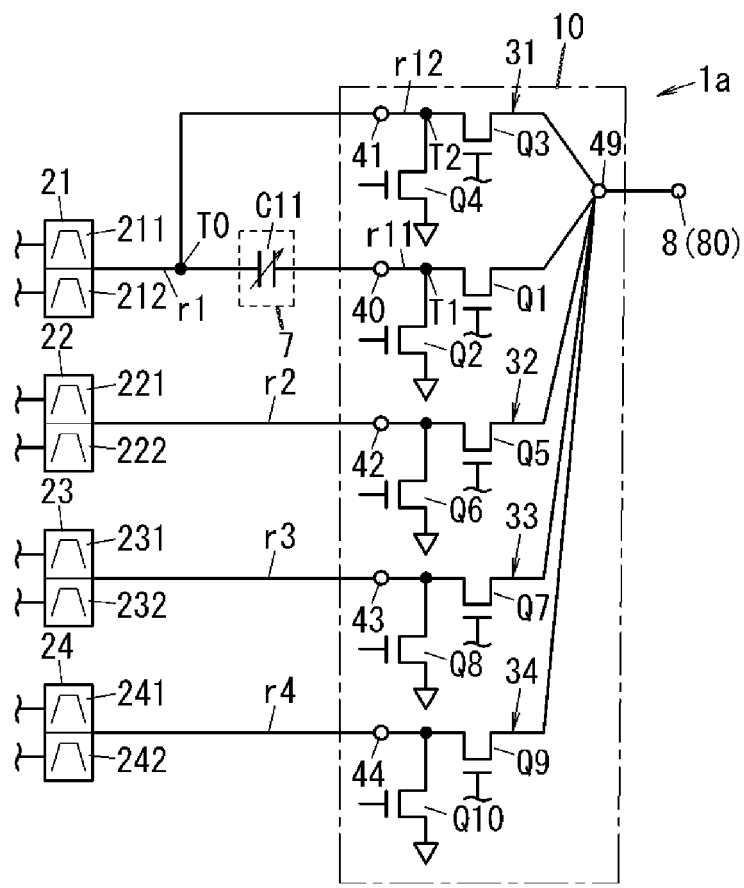
FIG. 6 is a circuit diagram of a radio frequency module according to a modification of Embodiment 1.

A radio frequency module 1a according to a modification of Embodiment 1 will be described with reference to FIG. 6. With respect to the radio frequency module 1a according to the modification, the same constituents as those of the radio frequency module 1 according to Embodiment 1 are denoted by the same reference signs, and a description thereof is omitted.

The radio frequency module 1a according to the modification is different from the radio frequency module 1 according to Embodiment 1 in that the phase shifter 7 is a digital tunable capacitor C11.

The digital tunable capacitor C11 is controlled by the control circuit 16 (see FIG. 1), for example. The radio frequency module 1a according to the modification may adjust the phase of a radio frequency signal passing through the first path r11 by changing the capacitance of the digital tunable capacitor C11, in accordance with a combination of communication bands in which simultaneous transmission or simultaneous communication is performed. The radio frequency module 1a according to the modification may adjust the phase of a radio frequency signal passing through the first path r11 in accordance with a pass band of a filter simultaneously used with the first filter 21, even when there is a frequency band other than the second frequency band to be simultaneously used with the first frequency band (when there is a third frequency band or a fourth frequency band, for example) in simultaneous transmission or simultaneous reception. The phase adjustment is achieved by changing the capacitance of the digital tunable capacitor C11 in accordance with the frequency band simultaneously used with the first frequency band.

Embodiment 2

Figure 7:
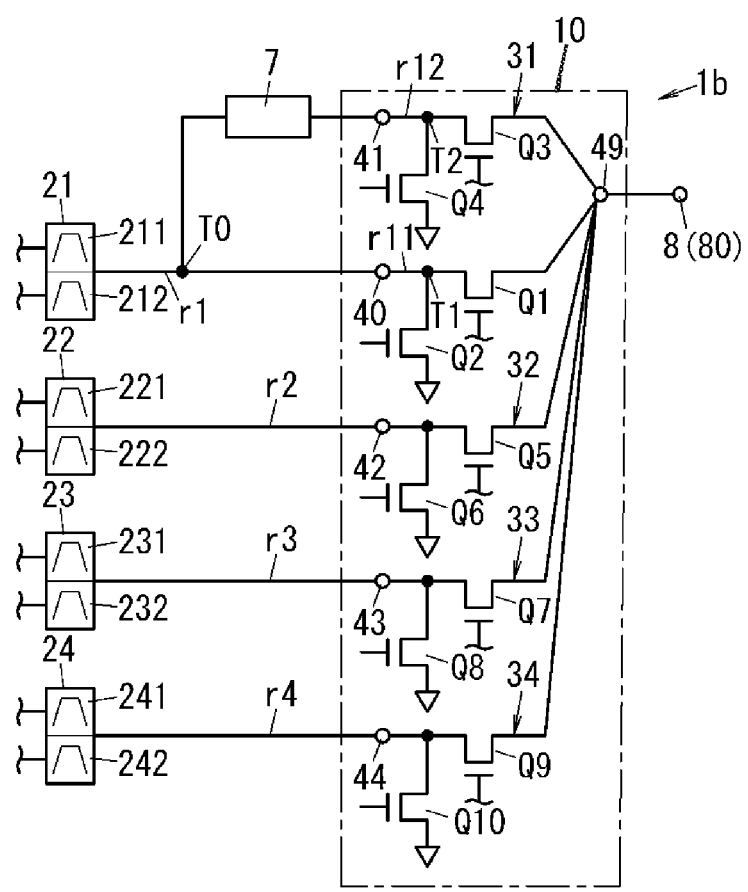
FIG. 7 is a circuit diagram of a radio frequency module according to Embodiment 2.

A radio frequency module 1b according to Embodiment 2 will be described with reference to FIG. 7. With respect to the radio frequency module 1b according to Embodiment 2, the same constituents as those of the radio frequency module 1 according to Embodiment 1 are denoted by the same reference signs, and a description thereof is omitted.

The radio frequency module 1b according to Embodiment 2 is different from the radio frequency module 1 according to Embodiment 1 in that the phase shifter 7 is provided in the second path r12.

In the radio frequency module 1b according to Embodiment 2, the phase shifter 7 is provided between the third switching element Q3 and the first filter 21 in the second path r12 of the signal path r1. More specifically, the phase shifter 7 is provided between a connection point T2 of the third switching element Q3 and the fourth switching element Q4, and a connection point T0, being connected to the first filter 21, of the first path r11 and the second path r12 in the signal path r1. More specifically, the phase shifter 7 is provided between the connection point T0 and the selection terminal 41 to which the third switching element Q3 is connected. In the radio frequency module 1b according to Embodiment 2, the connection point T1 of the first switching element Q1 and the second switching element Q2 is connected to the connection point T0, with no phase shifter 7 placed therebetween.

In the radio frequency module 1b, the phase shifter 7 is designed such that, in the second mode, a radio frequency signal between the first filter 21 and the antenna terminal 80 has a predetermined phase suitable for the second mode, for example.

Since the radio frequency module 1b according to Embodiment 2 includes the second switching element Q2 and the fourth switching element Q4 as in the radio frequency module 1 according to Embodiment 1, it is possible to improve the isolation between the first path r11 and the second path r12. Further, the radio frequency module 1b according to Embodiment 2 may include a digital tunable capacitor C11 (see FIG. 6) instead of the capacitor C1 (see FIG. 3) of the phase shifter 7. In the case above, the capacitance of the phase shifter 7 may be adjusted in accordance with the pass band of the first filter 21 connected to the second path r12.

Embodiment 3

Figure 8:
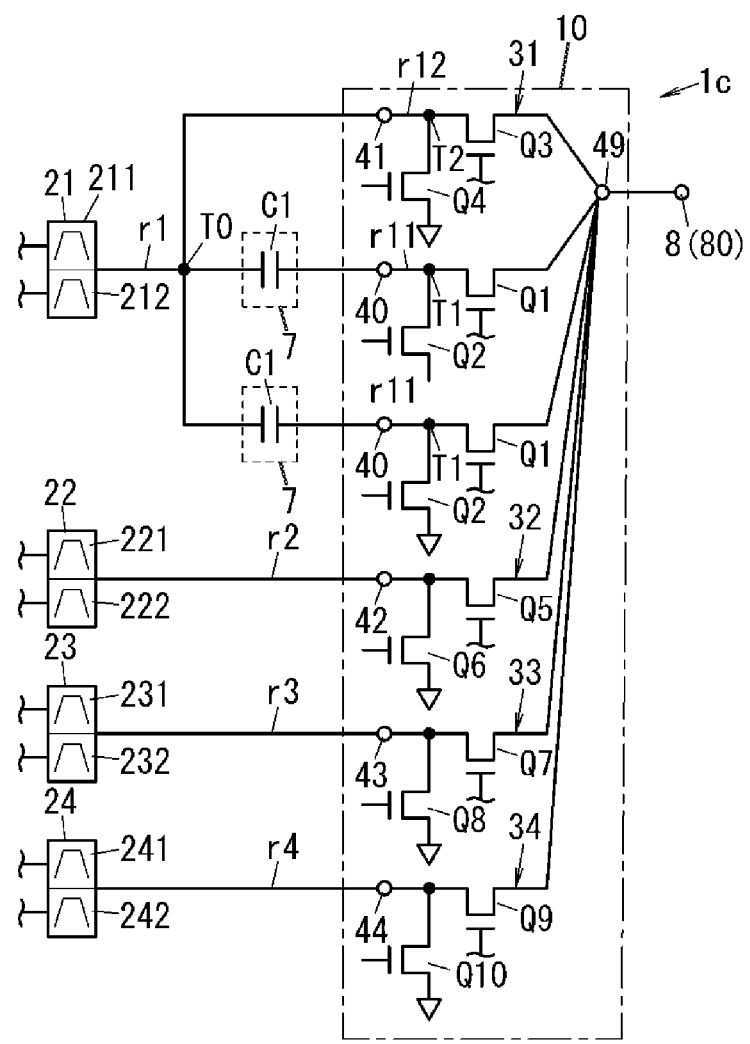
FIG. 8 is a circuit diagram of a radio frequency module according to Embodiment 3.

A radio frequency module 1c according to Embodiment 3 will be described with reference to FIG. 8. With respect to the radio frequency module 1c according to Embodiment 3, the same constituents as those of the radio frequency module 1 according to Embodiment 1 are denoted by the same reference signs, and a description thereof is omitted.

The radio frequency module 1c according to Embodiment 3 is different from the radio frequency module 1 according to Embodiment 1 in that the switch circuit 31 includes multiple (two, for example) first paths r11 and multiple (two, for example) phase shifters 7. The multiple phase shifters 7 are provided in a one-to-one basis with the multiple first paths r11. In the radio frequency module 1c according to Embodiment 3, the multiple phase shifters 7 are different from each other in impedance. More specifically, in the radio frequency module 1c according to Embodiment 3, each of the multiple phase shifters 7 includes the capacitor C1, and the capacitors C1 of the multiple phase shifters 7 are different from each other in capacitance. The radio frequency module 1c according to Embodiment 3 includes multiple (two) selection terminals 40 connected to the first filter 21, and a pair of the first switching element Q1 and the second switching element Q2 is provided for each of the multiple first paths r11. Therefore, the radio frequency module 1c has multiple (two) pairs of the first switching element Q1 and the second switching element Q2 for one first filter 21.

The radio frequency module 1c according to Embodiment 3 may adjust the phases of radio frequency signals passing through the first paths r11 in accordance with a pass band of a filter simultaneously used with the first filter 21, even when there is a frequency band other than the second frequency band to be simultaneously used with the first frequency band (when there is a third frequency band or a fourth frequency band, for example) in simultaneous transmission or simultaneous reception. The phase adjustment is achieved by changing a pair of the first switching element Q1 to be in the conductive state and the second switching element Q2 to be in the non-conductive state among multiple pairs of the first switching element Q1 and the second switching element Q2, in accordance with the frequency band simultaneously used with the first frequency band. In the radio frequency module 1c according to Embodiment 3, in simultaneous transmission, simultaneous reception, or simultaneous transmission and reception, the first switching element Q1 is in the conductive state and the second switching element Q2 is in the non-conductive state in one pair, among the multiple pairs of the first switching element Q1 and the second switching element Q2. However, the first switching elements Q1 and the second switching elements Q2 in the remaining pairs are in the non-conductive state.

Since the radio frequency module 1c according to Embodiment 3 includes the second switching element Q2 and the fourth switching element Q4 as in the radio frequency module 1 according to Embodiment 1, it is possible to improve the isolation between the first path r11 and the second path r12.

In the radio frequency module 1c according to Embodiment 3, the number of the first paths r11 is not limited to two and may be three or more.

Embodiment 4

Figure 9:
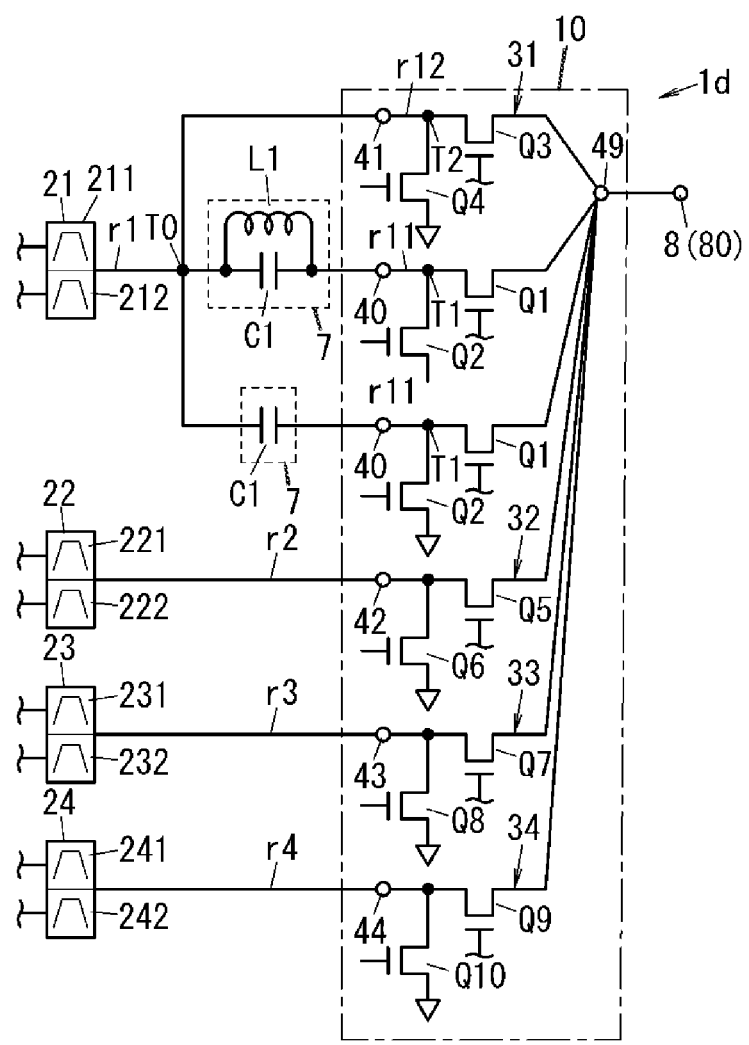
FIG. 9 is a circuit diagram of a radio frequency module according to Embodiment 4.

A radio frequency module 1d according to Embodiment 4 will be described with reference to FIG. 9. With respect to the radio frequency module 1d according to Embodiment 4, the same constituents as those of the radio frequency module 1c according to Embodiment 3 are denoted by the same reference signs, and a description thereof is omitted.

The radio frequency module 1d according to Embodiment 4 is different from the radio frequency module 1 according to Embodiment 1 in that at least one of the multiple (two, for example) phase shifters 7 configures an LC filter. The phase shifter 7 configuring the LC filter includes a capacitor C1 and an inductor L1 connected in parallel with the capacitor C1. The LC filter is configured to block the passage of a radio frequency signal in a predetermined frequency band different from the first frequency band.

As in the radio frequency module 1c according to Embodiment 3, the radio frequency module 1d according to Embodiment 4 may adjust the phases of radio frequency signals passing through the first paths r11 in accordance with a pass band of a filter simultaneously used with the first filter 21, even when there is a frequency band other than the second frequency band to be simultaneously used with the first frequency band (when there is a third frequency band or a fourth frequency band, for example) in simultaneous transmission or simultaneous reception. The phase adjustment is achieved by changing a pair of the first switching element Q1 to be in the conductive state and the second switching element Q2 to be in the non-conductive state among multiple pairs of the first switching element Q1 and the second switching element Q2, in accordance with the frequency band simultaneously used with the first frequency band.

Further, since the radio frequency module 1d according to Embodiment 4 includes the second switching element Q2 and the fourth switching element Q4 as in the radio frequency module 1c according to Embodiment 3, it is possible to improve the isolation between the first path r11 and the second path r12.

In the radio frequency module 1d according to Embodiment 4, one of the multiple phase shifters 7 configures an LC filter, but it is sufficient that at least one phase shifter 7 configures an LC filter, and each of the multiple phase shifters 7 may configures an LC filter.

Embodiment 5

Figure 10:
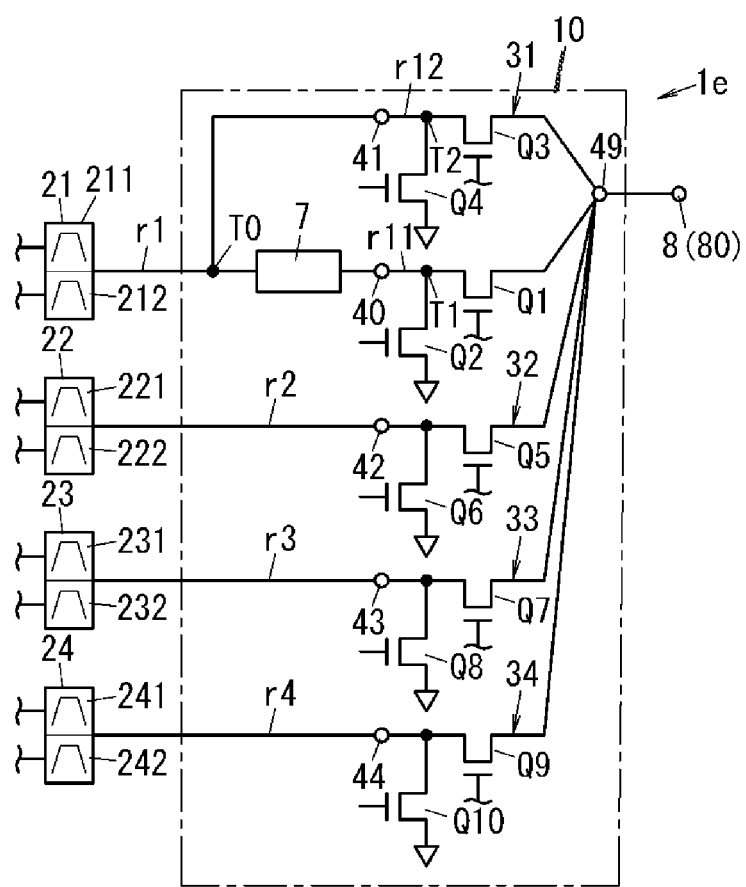
FIG. 10 is a circuit diagram of a radio frequency module according to Embodiment 5.

A radio frequency module 1e according to Embodiment 5 will be described with reference to FIG. 10 to FIG. 12. With respect to the radio frequency module 1e according to Embodiment 5, the same constituents as those of the radio frequency module 1 according to Embodiment 1 are denoted by the same reference signs, and a description thereof is omitted.

The radio frequency module 1e according to Embodiment 5 is different from the radio frequency module 1 according to Embodiment 1 in that the IC chip 10 includes the phase shifter 7 as well. The IC chip 10 includes the first switch 4, the control circuit 16, and the phase shifter 7, that is, includes the first switch circuit 31, the second switch circuit 32, the third switch circuit 33, and the fourth switch circuit 34, the control circuit 16, and the phase shifter 7, but is not limited thereto. It is sufficient that the IC chip 10 includes at least the switch circuit 31 and the phase shifter 7. The phase shifter 7 is provided between the selection terminal 40 of the first switch 4 and the first filter 21, but is not limited thereto, and may be provided between the selection terminal 40 and the connection point T1 of the first switching element Q1 and the second switching element Q12, for example.

Figure 11:
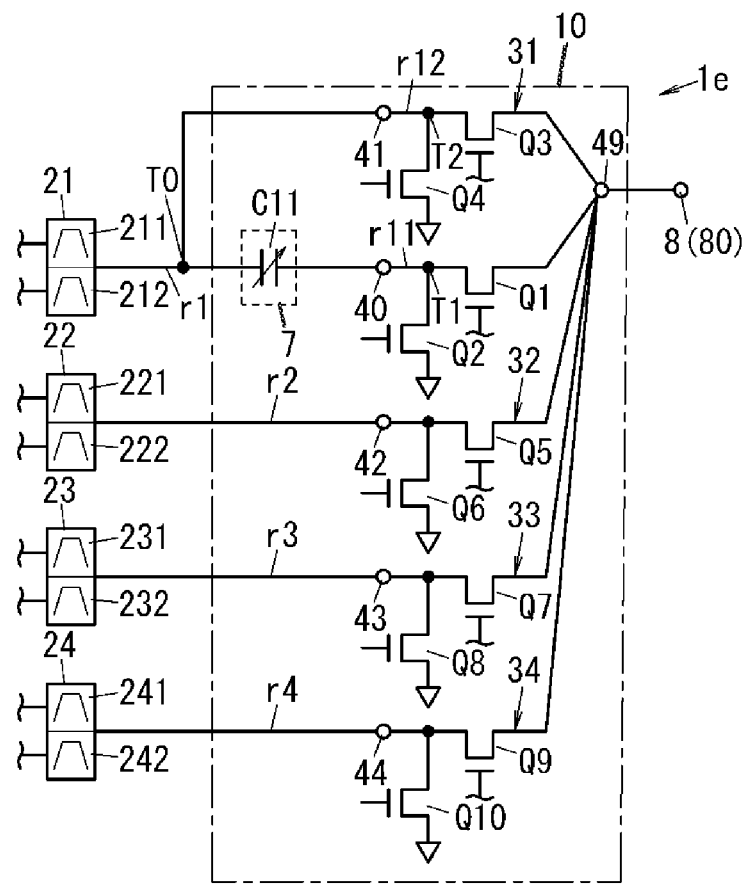
FIG. 11 is a circuit diagram of the radio frequency module according to Embodiment 5.

The phase shifter 7 includes a digital tunable capacitor C11 provided in the first path r11 as illustrated in FIG. 11, for example.

Further, the radio frequency module 1e according to Embodiment 5 is different from the radio frequency module 1 according to Embodiment 1 in that the IC chip 10 mounted on the second main surface 92 of the mounting substrate 9 includes the phase shifter 7, as illustrated in FIG. 12. That is, in the radio frequency module 1e according to Embodiment 5, (the circuit element of) the phase shifter 7 is not mounted on the first main surface 91 of the mounting substrate 9.

In the radio frequency module 1e, since the phase shifter 7 and the switch circuit 31 are included in the one IC chip 10, it is possible to shorten the wiring length between the phase shifter 7 and the switch circuit 31.

Further, in the radio frequency module 1e, the first filter 21 is mounted on the first main surface 91 of the mounting substrate 9, and the first filter 21 overlaps with the IC chip 10 in a plan view from the thickness direction D1 of the mounting substrate 9. In the radio frequency module 1e, part of the first filter 21 overlaps with part of the IC chip 10 in a plan view from the thickness direction D1 of the mounting substrate 9. However, without necessarily being limited to this, the whole of the first filter 21 may overlap with part of the IC chip 10, or the whole of the first filter 21 may overlap with the whole of the IC chip 10.

In the radio frequency module 1e, since the first filter 21 overlaps with the IC chip 10 in a plan view from the thickness direction D1 of the mounting substrate 9, it is possible to shorten the wiring length between the first filter 21 and the IC chip 10.

Since the radio frequency module 1e according to Embodiment 5 includes the second switching element Q2 and the fourth switching element Q4 as in the radio frequency module 1 according to Embodiment 1, it is possible to improve the isolation between the first path r11 and the second path r12.

The phase shifter 7 is not limited to a case of including the digital tunable capacitor C11, but may be configured to include a capacitor instead of the digital tunable capacitor C11, for example.

Modification of Embodiment 5

A radio frequency module 1f according to a modification of Embodiment 5 will be described with reference to FIG. 13. With respect to the radio frequency module 1f according to the modification, the same constituents as those of the radio frequency module 1e according to Embodiment 5 are denoted by the same reference signs, and a description thereof is omitted.

The radio frequency module 1f according to the modification is different from the radio frequency module 1e according to Embodiment 5 in that the multiple external connection terminals 8 are ball bumps. Further, the radio frequency module 1f according to the modification is different from the radio frequency module 1e according to Embodiment 5 in that the second resin layer 18 of the radio frequency module 1e according to Embodiment 5 is not included. The radio frequency module 1f according to the modification may include an underfill portion provided in a gap between the IC chip 10 flip-chip mounted on the second main surface 92 of the mounting substrate 9 and the second main surface 92 of the mounting substrate 9.

The material of the ball bump constituting each of the multiple external connection terminals 8 is gold, copper, solder, or the like, for example.

The multiple external connection terminals 8 may include an external connection terminal 8 configured of a ball bump and an external connection terminal 8 configured of a columnar electrode.

The radio frequency module 1f according to the modification may improve the isolation between the first path r11 and the second path r12, as in the radio frequency module 1e according to Embodiment 5.

Embodiment 6

A radio frequency module 1g according to Embodiment 6 will be described with reference to FIG. 14, and FIG. 15A to FIG. 15C. With respect to the radio frequency module 1g according to Embodiment 6, the same constituents as those of the radio frequency module 1 according to Embodiment 1 are denoted by the same reference signs, and a description thereof is omitted.

The radio frequency module 1g according to Embodiment 6 includes a first switching element Q11, a second switching element Q12, and a third switching element Q13 instead of the first switching element Q1 to the fourth switching element Q4 of the radio frequency module 1 according to Embodiment 1. The first switching element Q11 is provided in the first path r11 that is usable between the antenna terminal 80 and the first filter 21 in the first mode. The second switching element Q12 is provided in the second path r12 that is usable between the antenna terminal 80 and the first filter 21 in the second mode. The third switching element Q13 is provided between the ground and a common path r10 of the first path r11 and the second path r12. The radio frequency module 1g further includes the phase shifter 7. The phase shifter 7 is provided in the first path r11 and changes the phase of a radio frequency signal.

The phase shifter 7 is provided between the first switching element Q11 and the first filter 21 in the first path r11. More specifically, the phase shifter 7 is provided between the selection terminal 40 of the first switch 4 and the first filter 21. The phase shifter 7 includes a digital tunable capacitor, for example.

Figures 15A, 15B, 15C:
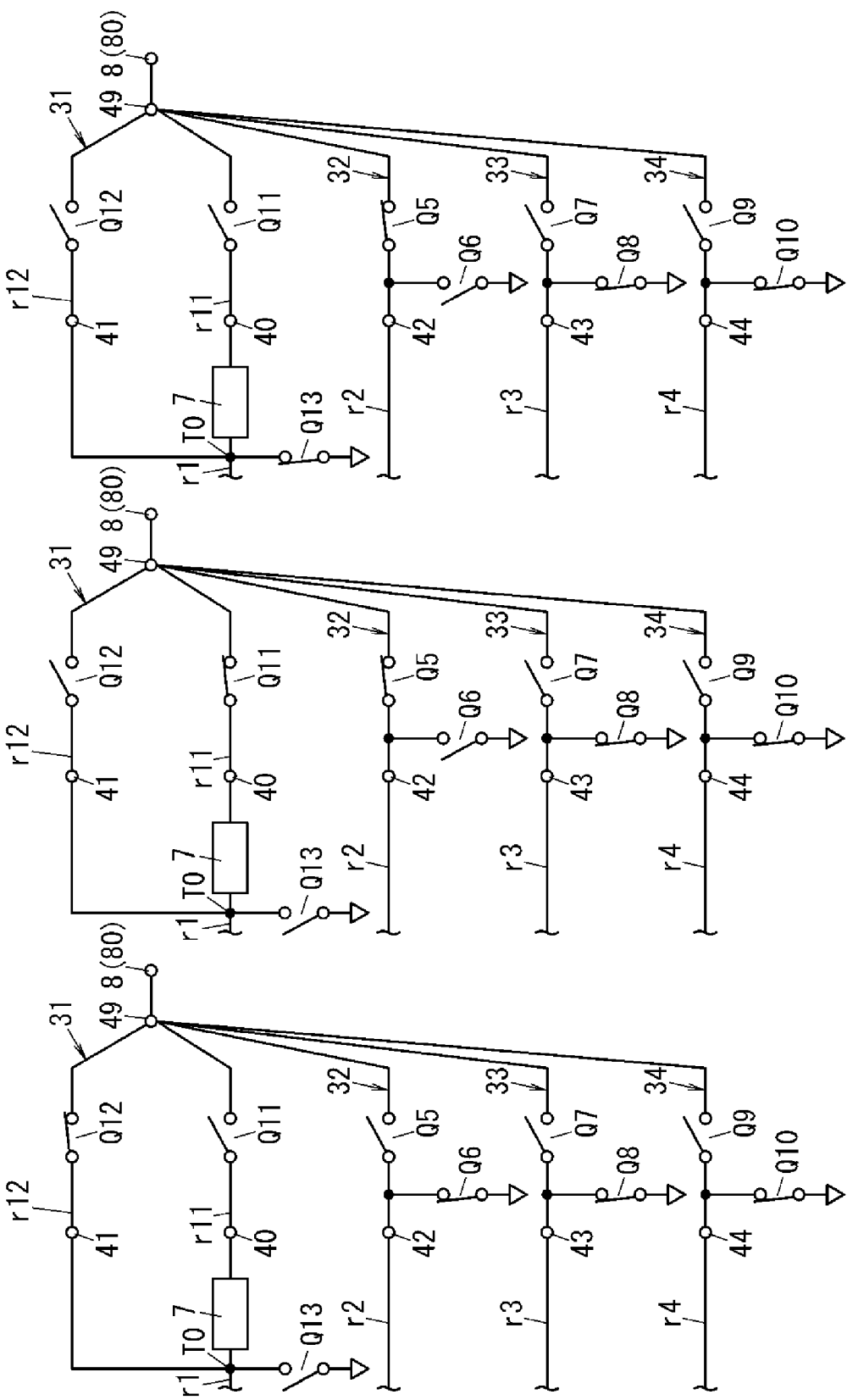
FIG. 15A to FIG. 15C are explanatory diagrams of the operation of the radio frequency module according to Embodiment 6.

Hereinafter, an operation example of the radio frequency module 1g will be described with reference to FIG. 15A to FIG. 15C. In FIG. 15A to FIG. 15C, in order to easily recognize the conductive state (ON) and the non-conductive state (OFF) of the first switching element Q11 to the third switching element Q13 and the fifth switching element Q5 to the tenth switching element Q10, graphic symbols of the first switching element Q11 to the third switching element Q13 and the fifth switching element Q5 to the tenth switching element Q10 are represented by graphic symbols of switches instead of graphic symbols of FETs. The control circuit 16 (see FIG. 1) controls the first switching element Q11 to the third switching element Q13 and the fifth switching element Q5 to the tenth switching element Q10 by controlling the gate-source voltage of the FET constituting each of the first switching element Q11 to the third switching element Q13 and the fifth switching element Q5 to the tenth switching element Q10. The control circuit 16 controls the first switching element Q11 to the third switching element Q13 and the fifth switching element Q5 to the tenth switching element Q10, based on a control signal from the signal processing circuit 301 (see FIG. 1), for example. In the radio frequency module 1g, upon receiving the first command from the signal processing circuit 301, the control circuit 16 controls the first switching element Q11 to the third switching element Q13 and the fifth switching element Q5 to the tenth switching element Q10 so as to deal with the first mode. Further, upon receiving the second command from the signal processing circuit 301, the control circuit 16 controls the first switching element Q11 to the third switching element Q13 and the fifth switching element Q5 to the tenth switching element Q10 so as to deal with the second mode.

In the radio frequency module 1g, in the first mode in which simultaneous transmission, simultaneous reception, or simultaneous transmission and reception is performed using both the first filter 21 and the second filter 22, each of the first switching element Q11 to the third switching element Q13 and the fifth switching element Q5 to the tenth switching element Q10 is in a state illustrated in FIG. 15B. Further, in the radio frequency module 1g, in the second mode in which transmission or reception is performed using only the first filter 21 out of the first filter 21 and the second filter 22, each of the first switching element Q11 to the third switching element Q13 and the fifth switching element Q5 to the tenth switching element Q10 is in a state illustrated in FIG. 15A. In addition, in the radio frequency module 1g, in the third mode in which transmission or reception is performed using only the second filter 22 out of the first filter 21 and the second filter 22, each of the first switching element Q11 to the third switching element Q13 and the fifth switching element Q5 to the tenth switching element Q10 is in a state illustrated in FIG. 15C.

In the first mode, as illustrated in FIG. 15B, in the first switch circuit 31, the first switching element Q11 in the first path r11 is in the conductive state (ON), the second switching element Q12 in the second path r12 is in the non-conductive state (OFF), and the third switching element Q13 is in the non-conductive state (OFF). In the radio frequency module 1g, in the first mode, since the third switching element Q13 is in the non-conductive state (OFF), the common path r10, the first path r11, and the second path r12 are not electrically connected to the ground, and are in an open state with respect to the ground. This makes it possible to prevent that a radio frequency signal is not able to pass through the first path r11 during the simultaneous transmission.

Further, in the first mode, as illustrated in FIG. 15B, in the second switch circuit 32, the fifth switching element Q5 in the signal path r2 (third path) is in the conductive state (ON), and the sixth switching element Q6 between the signal path r2 and the ground is in the non-conductive state (OFF). Further, in the first mode, as illustrated in FIG. 15B, in the third switch circuit 33, the seventh switching element Q7 in the signal path r3 is in the non-conductive state (OFF), and the eighth switching element Q8 between the signal path r3 and the ground is in the conductive state (ON). Since the eighth switching element Q8 is in the conductive state (ON), the signal path r3 of the third switch circuit 33 is electrically connected to the ground (is in a state being short-circuited to the ground). Further, in the first mode, as illustrated in FIG. 15B, in the fourth switch circuit 34, the ninth switching element Q9 in the signal path r4 is in the non-conductive state (OFF), and the tenth switching element Q10 between the signal path r4 and the ground is in the conductive state (ON). Since the tenth switching element Q10 is in the conductive state (ON), the signal path r4 of the fourth switch circuit 34 is electrically connected to the ground (is in a state being short-circuited to the ground).

In the second mode, as illustrated in FIG. 15A, in the first switch circuit 31, the first switching element Q11 in the first path r11 is in the non-conductive state (OFF), the second switching element Q12 in the second path r12 is in the conductive state (ON), and the third switching element Q13 is in the non-conductive state (OFF). In the radio frequency module 1g, in the second mode, since the third switching element Q13 is in the non-conductive state (OFF), the first path r11 and the second path r12 are not electrically connected to the ground (are in an open state with respect to the ground).

In the second mode, as illustrated in FIG. 15A, in the second switch circuit 32, the fifth switching element Q5 in the signal path r2 is in the non-conductive state (OFF), and the sixth switching element Q6 between the signal path r2 and the ground is in the conductive state (ON). Since the sixth switching element Q6 is in the conductive state (ON), the signal path r2 of the second switch circuit 32 is electrically connected to the ground (is in a state being short-circuited to the ground). Further, in the second mode, as illustrated in FIG. 15A, in the third switch circuit 33, the seventh switching element Q7 in the signal path r3 is in the non-conductive state (OFF), and the eighth switching element Q8 between the signal path r3 and the ground is in the conductive state (ON). Since the eighth switching element Q8 is in the conductive state (ON), the signal path r3 of the third switch circuit 33 is electrically connected to the ground (is in a state being short-circuited to the ground). Further, in the second mode, as illustrated in FIG. 15A, in the fourth switch circuit 34, the ninth switching element Q9 in the signal path r4 is in the non-conductive state (OFF), and the tenth switching element Q10 between the signal path r4 and the ground is in the conductive state (ON). Since the tenth switching element Q10 is in the conductive state (ON), the signal path r4 of the fourth switch circuit 34 is electrically connected to the ground (is in a state being short-circuited to the ground).

In the third mode, as illustrated in FIG. 15C, in the first switch circuit 31, the first switching element Q11 in the first path r11 is in the non-conductive state (OFF), the second switching element Q12 in the second path r12 is in the non-conductive state (OFF), and the third switching element Q13 is in the conductive state (ON). Since the third switching element Q13 is in the conductive state (ON), the first path r11 and the second path r12 are electrically connected to the ground (are in a state being short-circuited to the ground).

In the third mode, as illustrated in FIG. 15C, in the second switch circuit 32, the fifth switching element Q5 in the signal path r2 is in the conductive state (ON), and the sixth switching element Q6 between the signal path r2 and the ground is in the non-conductive state (OFF). Further, in the third mode, as illustrated in FIG. 15C, in the third switch circuit 33, the seventh switching element Q7 in the signal path r3 is in the non-conductive state (OFF), and the eighth switching element Q8 is in the conductive state (ON). In addition, in the third mode, as illustrated in FIG. 15C, in the fourth switch circuit 34, the ninth switching element Q9 in the signal path r4 is in the non-conductive state (OFF), and the tenth switching element Q10 is in the conductive state (ON).

Hereinafter, the operation of the control circuit 16 will be described in more detail.

Upon receiving the first command, as illustrated in FIG. 15B described above, the control circuit 16 controls the first switching element Q11 and the fifth switching element Q5 to be in the conductive state, controls the second switching element Q12, the third switching element Q13, the sixth switching element Q6, the seventh switching element Q7, and the ninth switching element Q9 to be in the non-conductive state, and controls the eighth switching element Q8 and the tenth switching element Q10 to be in the conductive state. Therefore, in the first mode, the control circuit 16 brings the third switching element Q13 corresponding to the first path r11 and the second path r12 into the non-conductive state.

Further, upon receiving the second command, as illustrated in FIG. 15A described above, the control circuit 16 controls the second switching element Q12 to be in the conductive state, controls the first switching element Q11, the third switching element Q13, the fifth switching element Q5, the seventh switching element Q7, and the ninth switching element Q9 to be in the non-conductive state, and controls the eighth switching element Q8 and the tenth switching element Q10 to be in the conductive state. Therefore, in the second mode, the control circuit 16 brings the first switching element Q11 and the third switching element Q13 into the non-conductive state with respect to the first switch circuit 31.

Hereinafter, for the convenience of description, each of the first switching element Q11, the second switching element Q12, the fifth switching element Q5, the seventh switching element Q7, and the ninth switching element Q9 may sometimes be referred to as a series switch without necessarily being distinguished from one another. Further, each of the third switching element Q13, the sixth switching element Q6, the eighth switching element Q8, and the tenth switching element Q10 may sometimes be referred to as a shunt switch without necessarily being distinguished from one another. The radio frequency module 1g includes multiple (five) pairs of a series switch and a shunt switch. The multiple pairs include a pair of the first switching element Q11 and the third switching element Q13, a pair of the second switching element Q12 and the third switching element Q13, a pair of the fifth switching element Q5 and the sixth switching element Q6, a pair of the seventh switching element Q7 and the eighth switching element Q8, and a pair of the ninth switching element Q9 and the tenth switching element Q10. The third switching element Q13 is paired with each of the first switching element Q11 and the second switching element Q12.

When the radio frequency module 1g operates in the first mode, the control circuit 16 brings both the series switch and the shunt switch corresponding to the second path r12 into the non-conductive state, and exclusively controls the series switch and the shunt switch in a pair of the series switch and the shunt switch corresponding to each of the first path r11, the signal path r2, the signal path r3, and the signal path r4. "Exclusively controls the series switch and the shunt switch in a pair" means that, with respect to a pair of a series switch and a shunt switch, one of the series switch and the shunt switch is controlled to be in the conductive state, and the other of the series switch and the shunt switch is controlled to be in the non-conductive state. Further, when the radio frequency module 1g operates in the second mode, the control circuit 16 brings both the series switch and the shunt switch corresponding to the first path r11 into the non-conductive state, and exclusively controls the series switch and the shunt switch in a pair of the series switch and the shunt switch corresponding to each of the second path r12, the signal path r2, the signal path r3, and the signal path r4.

Since the radio frequency module 1g according to Embodiment 6 includes the third switching element Q13, it is possible to improve the isolation between the first path r11 and the second path r12.

The phase shifter 7 may include a capacitor instead of a digital tunable capacitor. The phase shifter 7 is not limited to be provided between the selection terminal 40 of the first switch 4 and the first filter 21, but may be provided between the first switching element Q11 and the selection terminal 40, for example. Further, the phase shifter 7 may be provided in the second path r12 instead of the first path r11.

Other Modifications

Each of Embodiment 1 to Embodiment 6 described above is merely one of diverse embodiments of the present disclosure. Each of Embodiment 1 to Embodiment 6 described above may variously be modified in accordance with the design or the like as long as the object of the present disclosure is achieved.

It is acceptable that the radio frequency modules 1 to 1g may be configured such that the first switch 4 is controlled by the controller 14 without necessarily including the control circuit 16, or the first switch 4 is directly controlled by the signal processing circuit 301.

Further, in the radio frequency module 1 to the radio frequency module 1f, each of the first switching element Q1 to the tenth switching element Q10 is not limited to an FET, but may be a bipolar transistor, a CMOS switch, or a MEMS switch, for example. Further, in the radio frequency module 1g, each of the first switching element Q11 to the third switching element Q13 and the fifth to tenth switching elements Q10 is not limited to an FET, but may be a bipolar transistor or a CMOS switch, for example.

The phase shifter 7 is not limited to be provided in one of the first path r11 and the second path r12 of the switch circuit 31, but may be provided in both the first path r11 and the second path r12.

Further, the transmission filters 211, 221, 231, and 241 and the reception filters 212, 222, 232, and 242 are acoustic wave filters using a surface acoustic wave, but are not limited thereto, and may be acoustic wave filters using a boundary acoustic wave, a plate wave, or the like, for example.

The acoustic wave filter is not limited to have a configuration including multiple SAW resonators, but may have a configuration including multiple Bulk Acoustic Wave (BAW) resonators, for example.

Further, the radio frequency modules 1 to 1g may include a multiplexer, a coupler, and the like between the antenna terminal 80 and the first switch 4. The multiplexer is a diplexer or a triplexer, for example.

Circuit configurations of the radio frequency modules 1 to 1g are not limited to the examples described above. Further, each of the radio frequency modules 1 to 1g may include a radio frequency front-end circuit dealing with Multi Input Multi Output (MIMO) as a circuit configuration, for example.

In addition, the communication device 300 according to Embodiment 1 may include any one of the radio frequency modules 1a, 1b, 1c, 1d, 1e, 1f, and 1g instead of the radio frequency module 1.

(Aspect)

The following aspects are disclosed in the present description.

A radio frequency module (1; 1a; 1b; 1c; 1d; 1e; 1f) according to a first aspect includes an antenna terminal (80), a first filter (21), a second filter (22), and a switch circuit (31). The first filter (21) is a filter having a pass band of a first frequency band. The second filter (22) is a filter having a pass band of a second frequency band different from the first frequency band. The switch circuit (31) is connected between the antenna terminal (80) and the first filter (21). The radio frequency module (1; 1a; 1b; 1c; 1d; 1e; 1f) is capable of operating in a first mode in which simultaneous transmission, simultaneous reception, or simultaneous transmission and reception using both the first filter (21) and the second filter (22) is possible, and in a second mode in which transmission or reception using only the first filter (21) out of the first filter (21) and the second filter (22) is possible. The switch circuit (31) includes a first switching element (Q1), a second switching element (Q2), a third switching element (Q3), and a fourth switching element (Q4). The first switching element (Q1) is provided in a first path (r11) that is usable between the antenna terminal (80) and the first filter (21) in the first mode. The second switching element (Q2) is provided between the first path (r11) and a ground. The third switching element (Q3) is provided in a second path (r12) that is usable between the antenna terminal (80) and the first filter (21) in the second mode. The fourth switching element (Q4) is provided between the second path (r12) and the ground. The radio frequency module (1; 1a; 1b; 1c; 1d; 1e; 1f) further includes a phase shifter (7). The phase shifter (7) is provided in at least one of the first path (r11) and the second path (r12), and changes the phase of a radio frequency signal.

In the radio frequency module (1; 1a; 1b; 1c; 1d; 1e; 1f) according to the first aspect, it is possible to improve the isolation between the first path (r11) and the second path (r12).

In a radio frequency module (1; 1a; 1b; 1c; 1d; 1e; 1f) according to a second aspect, in the first aspect, when one of the first switching element (Q1) and the third switching element (Q3) is in a conductive state and the other of the first switching element (Q1) and the third switching element (Q3) is in a non-conductive state, the second switching element (Q2) and the fourth switching element (Q4) are in the non-conductive state.

In the radio frequency module (1; 1a; 1b; 1c; 1d; 1e; 1f) according to the second aspect, it is possible to suppress the deterioration in characteristics when operating in each of the first mode and the second mode.

In a radio frequency module (1; 1a; 1c; 1d; 1e; 1f) according to a third aspect, in the first or second aspect, the second switching element (Q2) is connected to a path between the first switching element (Q1) and the first filter (21) in the first path (r11). The fourth switching element (Q4) is connected to a path between the third switching element (Q3) and the first filter (21) in the second path (r12).

In the radio frequency module (1; 1a; 1c; 1d; 1e; 1f) according to the third aspect, when the reception using only the second filter (22) out of the first filter (21) and the second filter (22) is performed, the second switching element (Q2) and the fourth switching element (Q4) may be brought into the non-conductive state, for example.

A radio frequency module (1; 1a; 1c; 1d; 1e; 1f) according to a fourth aspect, in any one of the first to third aspects, further includes a second switch circuit (32) in addition to a first switch circuit (31) being the switch circuit (31). The second switch circuit (32) is connected between the antenna terminal (80) and the second filter (22). The second switch circuit (32) includes a fifth switching element (Q5) and a sixth switching element (Q6). The fifth switching element (Q5) is provided in a third path (signal path r2) between the antenna terminal (80) and the second filter (22). The sixth switching element (Q6) is provided between the third path (signal path r2) and the ground.

The radio frequency module (1; 1a; 1b; 1c; 1d; 1e; 1f) according to the fourth aspect may bring the fifth switching element (Q5) into the conductive state and the sixth switching element (Q6) into the non-conductive state when operating in the first mode, and may bring the fifth switching element (Q5) into the non-conductive state and the sixth switching element (Q6) into the conductive state when operating in the second mode. Thus, in the radio frequency module (1; 1a; 1b; 1c; 1d; 1e; 1f) according to the fourth aspect, it is possible to improve each of the isolation between the first path (r11) and the third path (signal path r2), and the isolation between the second path (r12) and the third path (signal path r2).

In a radio frequency module (1; 1a; 1c; 1d; 1e; 1f) according to a fifth aspect, in any one of the first to fourth aspects, the phase shifter (7) is provided in the first path (r11).

The radio frequency module (1; 1a; 1c; 1d; 1e; 1f) according to the fifth aspect may change the phase of a radio frequency signal passing through the first path (r11).

In a radio frequency module (1b) according to a sixth aspect, in any one of the first to fourth aspects, the phase shifter (7) is provided in the second path (r12).

The radio frequency module (1b) according to the sixth aspect may change the phase of a radio frequency signal passing through the second path (r12).

In a radio frequency module (1c; 1d) according to a seventh aspect, in the fifth aspect, the switch circuit (31) includes multiple first paths (r11). The radio frequency module (1c; 1d) includes multiple phase shifters (7). The multiple phase shifters (7) are provided in a one-to-one basis with the multiple first paths (r11). The multiple phase shifters (7) are different from each other in impedance.

The radio frequency module (1c; 1d) according to the seventh aspect may adjust the phases of radio frequency signals passing through the first paths (r11) in accordance with a pass band of a filter simultaneously used with the first filter (21), even when there is a frequency band simultaneously used with the first frequency band other than the second frequency band (when there is a third frequency band or a fourth frequency band, for example) in simultaneous transmission or simultaneous reception. The phase adjustment is achieved by changing a pair of the first switching element (Q1) to be in the conductive state and the second switching element (Q2) to be in the non-conductive state among multiple pairs of the first switching element (Q1) and the second switching element (Q2), in accordance with the frequency band simultaneously used with the first frequency band.

In a radio frequency module (1d) according to an eighth aspect, in the seventh aspect, at least one of the multiple phase shifters (7) configures an LC filter.

The radio frequency module (1d) according to the eighth aspect may block a radio frequency signal in a frequency band different from the pass band of the first filter (21) in the phase shifter (7) configuring an LC filter.

In a radio frequency module (1; 1a; 1b; 1c; 1d; 1e; 1f) according to a ninth aspect, in any one of the first to eighth aspects, each of the first switching element (Q1), the second switching element (Q2), the third switching element (Q3), and the fourth switching element (Q4) is an FET.

In the radio frequency module (1; 1a; 1b; 1c; 1d; 1e; 1f) according to the ninth aspect, power consumption of each of the first switching element (Q1), the second switching element (Q2), the third switching element (Q3), and the fourth switching element (Q4) may be reduced.

A radio frequency module (1g) according to a tenth aspect includes the antenna terminal (80), the first filter (21), the second filter (22), and the switch circuit (31). The first filter (21) is a filter having a pass band of the first frequency band. The second filter (22) is a filter having a pass band of the second frequency band different from the first frequency band. The switch circuit (31) is connected between the antenna terminal (80) and the first filter (21). The radio frequency module (1g) is capable of operating in a first mode in which simultaneous transmission, simultaneous reception, or simultaneous transmission and reception using both the first filter (21) and the second filter (22) is possible, and in a second mode in which transmission or reception using only the first filter (21) out of the first filter (21) and the second filter (22) is possible. The radio frequency module (1g) includes a first switching element (Q11), a second switching element (Q12), and a third switching element (Q13). The first switching element (Q11) is provided in a first path (r1) that is usable between the antenna terminal (80) and the first filter (21) in the first mode. The second switching element (Q12) is provided in a second path (r12) that is usable between the antenna terminal (80) and the first filter (21) in the second mode. The third switching element (Q13) is provided between the ground and a common path (r10) of the first path (r11) and the second path (r12). The radio frequency module (1g) further includes the phase shifter (7). The phase shifter (7) is provided in at least one of the first path (r11) and the second path (r12), and changes the phase of a radio frequency signal.

In the radio frequency module (1g) according to the tenth aspect, it is possible to improve the isolation between the first path (r11) and the second path (r12).

In a radio frequency module (1g) according to an eleventh aspect, in the tenth aspect, when one of the first switching element (Q11) and the second switching element (Q12) is in the conductive state and the other of the first switching element (Q11) and the second switching element (Q12) is in the non-conductive state, the third switching element (Q13) is in the non-conductive state.

In a radio frequency module (1g) according to a twelfth aspect, in the tenth or eleventh aspect, each of the first switching element (Q11), the second switching element (Q12), and the third switching element (Q13) is an FET.

In the radio frequency module (1g) according to the twelfth aspect, power consumption of each of the first switching element (Q11), the second switching element (Q12), and the third switching element (Q13) may be reduced.

A radio frequency module (1; 1a; 1b; 1c; 1d; 1e; 1f; 1g) according to a thirteenth aspect, in any one of the first to twelfth aspects, further includes a control circuit (16). The control circuit (16) controls the switch circuit (31).

In the radio frequency module (1; 1a; 1b; 1c; 1d; 1e; 1f; 1g) according to the thirteenth aspect, the switch circuit (31) may be controlled by the control circuit (16).

In a radio frequency module (1; 1a; 1b; 1c; 1d; 1e; 1f; 1g) according to a fourteenth aspect, in any one of the first to thirteenth aspects, the first filter (21) is a duplexer including a transmission filter (211) and a reception filter (212).

When the radio frequency module (1; 1a; 1b; 1c; 1d; 1e; 1f; 1g) according to the fourteenth aspect operates in the first mode, the first filter (21) may deal with both the simultaneous transmission and simultaneous reception. Further, when the radio frequency module (1; 1a; 1b; 1c; 1d; 1e; 1f; 1g) according to the fourteenth aspect operates in the second mode, the first filter (21) may deal with both the transmission and reception.

In a radio frequency module (1; 1b; 1c; 1d) according to a fifteenth aspect, in any one of the first to fourteenth aspects, the phase shifter (7) includes a capacitor (C1).

The radio frequency module (1; 1b; 1c; 1d) according to the fifteenth aspect may change the phase of a radio frequency signal by the capacitor (C1).

In a radio frequency module (1a; 1b; 1e; 1f; 1g) according to a sixteenth aspect, in any one of the first to fourteenth aspects, the phase shifter (7) includes a digital tunable capacitor (C11).

The radio frequency module (1a; 1b; 1e; 1f; 1g) according to the sixteenth aspect may adjust the phase of a radio frequency signal passing through the first path (r11) in accordance with a pass band of a filter simultaneously used with the first filter (21), even when there is a frequency band simultaneously used with the first frequency band other than the second frequency band in simultaneous transmission or simultaneous reception. The phase adjustment is achieved by changing the capacitance of the digital tunable capacitor (C11) in accordance with the frequency band simultaneously used with the first frequency band.

A radio frequency module (1e; 1f) according to a seventeenth aspect, in the sixteenth aspect, further includes an IC chip (10) including at least the switch circuit (31) and the phase shifter (7).

In the radio frequency module (1e; 1f) according to the seventeenth aspect, it is possible to shorten the wiring length between the switch circuit (31) and the phase shifter (7).

A radio frequency module (1; 1a; 1b; 1c; 1d) according to an eighteenth aspect, in any one of the first to sixteenth aspects, further includes a mounting substrate (9). The mounting substrate (9) has a first main surface (91) and a second main surface (92) opposed to each other. A circuit element (capacitor C1) of the phase shifter (7) is mounted on the first main surface (91) of the mounting substrate (9). The IC chip (10) including the switch circuit (31) is mounted on the second main surface (92) of the mounting substrate (9). The circuit element (capacitor C1) of the phase shifter (7) overlaps with the IC chip (10) in a plan view from the thickness direction (D1) of the mounting substrate (9).

In the radio frequency module (1; 1a; 1b; 1c; 1d) according to the eighteenth aspect, it is possible to shorten the wiring length between the phase shifter (7) and the switch circuit (31).

In a radio frequency module (1e; 1f) according to a nineteenth aspect, in the eighteenth aspect, the first filter (21) is mounted on the first main surface (91) of the mounting substrate (9). The first filter (21) overlaps with the IC chip (10) in a plan view from the thickness direction (D1) of the mounting substrate (9).

In the radio frequency module (1; 1a; 1b; 1c; 1d) according to the nineteenth aspect, it is possible to shorten the wiring length between the first filter (21) and the IC chip (10).

A communication device (300) according to a twentieth aspect includes the radio frequency module (1; 1a; 1b; 1c; 1d; 1e; 1f; 1g) according to any one of the first to nineteenth aspects, and a signal processing circuit (301). The signal processing circuit (301) is connected to the radio frequency module (1; 1a; 1b; 1c; 1d; 1e; 1f; 1g).

In the communication device (300) according to the twentieth aspect, it is possible to improve the isolation between the first path (r11) and the second path (r12).

A radio frequency module radio frequency module (1; 1a; 1b; 1c; 1d; 1e; 1f) according to a twenty-first aspect includes the antenna terminal (80), the first filter (21), the second filter (22), and the switch circuit (31). The first filter (21) is a filter having a pass band of the first frequency band. The second filter (22) is a filter having a pass band of the second frequency band different from the first frequency band. The switch circuit (31) is connected between the antenna terminal (80) and the first filter (21). The switch circuit (31) includes the first switching element (Q1), the second switching element (Q2), the third switching element (Q3), and the fourth switching element (Q4). The first switching element (Q1) is provided in the first path (r11) between the antenna terminal (80) and the first filter (21). The second switching element (Q2) is provided between the first path (r11) and the ground. The third switching element (Q3) is provided in the second path (r12) between the antenna terminal (80) and the first filter (21). The fourth switching element (Q4) is provided between the second path (r12) and the ground. The radio frequency module (1; 1a; 1b; 1c; 1d; 1e; 1f) further includes the phase shifter (7). The phase shifter (7) is provided in at least one of the first path (r11) and the second path (r12), and changes the phase of a radio frequency signal.

In the radio frequency module (1; 1a; 1b; 1c; 1d; 1e; 1f) according to the twenty-first aspect, it is possible to improve the isolation between the first path (r11) and the second path (r12).

In the radio frequency module (1; 1a; 1b; 1c; 1d; 1e; 1f) according to the twenty-first aspect, the configurations according to the second to ninth and thirteenth to nineteenth aspects may be added as appropriate. Further, the communication device (300) according to the twentieth aspect may include the radio frequency module (1; 1a; 1b; 1c; 1d; 1e; 1f) according to the twenty-first aspect, instead of the radio frequency module (1; 1a; 1b; 1c; 1d; 1e; 1f) according to the first aspect.

REFERENCE SIGNS LIST 1, 1a, 1b, 1c, 1d, 1e, 1f, 1g RADIO FREQUENCY MODULE
4 FIRST SWITCH
40 to 44 SELECTION TERMINAL
49 COMMON TERMINAL
5 SECOND SWITCH
50 COMMON TERMINAL
51 to 54 SELECTION TERMINAL
6 THIRD SWITCH
60 COMMON TERMINAL
61 to 64 SELECTION TERMINAL
7 PHASE SHIFTER
8 EXTERNAL CONNECTION TERMINAL
80 ANTENNA TERMINAL
81 SIGNAL INPUT TERMINAL
82 SIGNAL OUTPUT TERMINAL
83 FIRST CONTROL TERMINAL
84 SECOND CONTROL TERMINAL
85 GROUND TERMINAL
9 MOUNTING SUBSTRATE
91 FIRST MAIN SURFACE
92 SECOND MAIN SURFACE
93 OUTER PERIPHERAL SURFACE
10 IC CHIP
11 POWER AMPLIFIER
13 OUTPUT MATCHING CIRCUIT
14 CONTROLLER
15 LOW-NOISE AMPLIFIER
16 CONTROL CIRCUIT
17 FIRST RESIN LAYER
171 MAIN SURFACE
173 OUTER PERIPHERAL SURFACE
18 SECOND RESIN LAYER
183 OUTER PERIPHERAL SURFACE
21 FIRST FILTER
211 TRANSMISSION FILTER
212 RECEPTION FILTER
22 SECOND FILTER
221 TRANSMISSION FILTER
222 RECEPTION FILTER
23 THIRD FILTER
231 TRANSMISSION FILTER
232 RECEPTION FILTER
24 FOURTH FILTER
241 TRANSMISSION FILTER

242 RECEPTION FILTER
31 SWITCH CIRCUIT (FIRST SWITCH CIRCUIT)
32 SECOND SWITCH CIRCUIT
33 THIRD SWITCH CIRCUIT
34 FOURTH SWITCH CIRCUIT
300 COMMUNICATION DEVICE
301 SIGNAL PROCESSING CIRCUIT
302 RF SIGNAL PROCESSING CIRCUIT
303 BASEBAND SIGNAL PROCESSING CIRCUIT
310 ANTENNA
C1 CAPACITOR (CIRCUIT ELEMENT)
C11 DIGITAL TUNABLE CAPACITOR
D1 THICKNESS DIRECTION
L1 INDUCTOR
Q1 FIRST SWITCHING ELEMENT
Q2 SECOND SWITCHING ELEMENT
Q3 THIRD SWITCHING ELEMENT
Q4 FOURTH SWITCHING ELEMENT
Q11 FIRST SWITCHING ELEMENT
Q12 SECOND SWITCHING ELEMENT
Q13 THIRD SWITCHING ELEMENT
r1 SIGNAL PATH
r10 COMMON PATH
r11 FIRST PATH
r12 SECOND PATH
r2 SIGNAL PATH (THIRD PATH)
r3 SIGNAL PATH
r4 SIGNAL PATH

The invention claimed is:

1. A radio frequency module, comprising:
an antenna terminal;
a first filter comprising a pass band of a first frequency band;
a second filter comprising a pass band of a second frequency band different from the first frequency band; and
a switch circuit connected between the antenna terminal and the first filter,
wherein the radio frequency module is configured to operate:
in a first mode in which simultaneous transmission, simultaneous reception, or simultaneous transmission and reception that utilizes both the first filter and the second filter, and
in a second mode in which transmission or reception that utilizes only the first filter out of the first filter and the second filter,
the switch circuit comprises:
a first switching element in a first path that is usable between the antenna terminal and the first filter in the first mode,
a second switching element between the first path and a ground,
a third switching element in a second path that is usable between the antenna terminal and the first filter in the second mode, and
a fourth switching element between the second path and the ground, and
the radio frequency module further comprising:
a phase shifter circuit in at least one of the first path and the second path and is configured to change a phase of a radio frequency signal.

2. The radio frequency module according to claim 1, wherein when one of the first switching element and the third switching element is in a conductive state and another of the first switching element and the third switching element is in a non-conductive state, the second switching element and the fourth switching element are in the non-conductive state.

3. The radio frequency module according to claim 1, wherein the second switching element is connected between the first switching element and the first filter in the first path, and
the fourth switching element is connected between the third switching element and the first filter in the second path.

4. The radio frequency module according to claim 1, further comprising:
a second switch circuit connected between the antenna terminal and the second filter in addition to a first switch circuit comprising the switch circuit,
wherein the second switch circuit comprises:
a fifth switching element in a third path between the antenna terminal and the second filter, and
a sixth switching element between the third path and the ground.

5. The radio frequency module according to claim 1, wherein the phase shifter circuit is in the first path.

6. The radio frequency module according to claim 5, wherein the switch circuit comprises:
a plurality of the first paths,
the radio frequency module comprises:
a plurality of the phase shifter circuits and
the plurality of the phase shifter circuits are in the plurality of the first paths on a one-to-one basis, and
the plurality of the phase shifter circuits are different from each other in impedance.

7. The radio frequency module according to claim 6, wherein at least one of the plurality of the phase shifter circuits comprises an inductor-capacitor (LC) filter.

8. The radio frequency module according to claim 1, wherein the phase shifter circuit is in the second path.

9. The radio frequency module according to claim 1, wherein each of the first switching element, the second switching element, the third switching element, and the fourth switching element comprises a field-effect transistor (FET).

10. The radio frequency module according to claim 1, further comprising:
a control circuit configured to control the switch circuit.

11. The radio frequency module according to claim 1, wherein the first filter comprises a duplexer comprising a transmission filter and a reception filter.

12. The radio frequency module according to claim 1, wherein the phase shifter circuit comprises a capacitor.

13. The radio frequency module according to claim 1, wherein the phase shifter circuit comprises a digital tunable capacitor.

14. The radio frequency module according to claim 13, further comprising:
an integrated circuit (IC) chip that comprises at least the switch circuit and the phase shifter circuit.

15. The radio frequency module according to claim 1, further comprising:
a mounting substrate comprising a first main surface and a second main surface that are opposed to each other,
wherein a circuit element of the phase shifter circuit is mounted on the first main surface of the mounting substrate,
an integrated circuit (IC) chip, comprising the switch circuit, is mounted on the second main surface of the mounting substrate, and the circuit element of the phase shifter circuit overlaps with the IC chip in a plan view from a thickness direction of the mounting substrate.

16. The radio frequency module according to claim 15, wherein the first filter is mounted on the first main surface of the mounting substrate, and
the first filter overlaps with the IC chip in a plan view from the thickness direction of the mounting substrate.

17. A communication device, comprising:
the radio frequency module according to claim 1; and
a signal processing circuit connected to the radio frequency module.

18. A radio frequency module, comprising:
an antenna terminal;
a first filter comprising a pass band of a first frequency band;
a second filter comprising a pass band of a second frequency band different from the first frequency band; and
a switch circuit connected between the antenna terminal and the first filter,
wherein the radio frequency module is configured to operate:
  in a first mode in which simultaneous transmission, simultaneous reception, or simultaneous transmission and reception that utilizes both the first filter and the second filter, and
  in a second mode in which transmission or reception that utilizes only the first filter out of the first filter and the second filter,
the radio frequency module further comprises:
  a first switching element in a first path that is usable between the antenna terminal and the first filter in the first mode,
  a second switching element in a second path that is usable between the antenna terminal and the first filter in the second mode, and
  a third switching element between a ground and a common path of the first path and the second path, and
the radio frequency module further comprises:
  a phase shifter circuit that is in at least one of the first path and the second path and is configured to change a phase of a radio frequency signal.

19. The radio frequency module according to claim 18, wherein when one of the first switching element and the second switching element is in a conductive state and another of the first switching element and the second switching element is in a non-conductive state, the third switching element is in the non-conductive state.

20. The radio frequency module according to claim 18, wherein each of the first switching element, the second switching element, and the third switching element comprises a field-effect transistor (FET).

* * * * *